United States Patent [19]

Yamauchi et al.

[11] Patent Number: 5,689,578
[45] Date of Patent: Nov. 18, 1997

[54] POLARIZED WAVE HOLDING OPTICAL FIBER, PRODUCTION METHOD THEREFOR, CONNECTION METHOD THEREFOR, OPTICAL AMPLIFIER, LASER OSCILLATOR AND POLARIZED WAVE HOLDING OPTICAL FIBER COUPLER

[75] Inventors: Ryozo Yamauchi; Kuniharu Himeno, both of Sakura; Minoru Sawada, Yachiyo; Fumio Suzuki, Sanbu-gun; Kazuhiko Aikawa, Sakura; Tetsuo Nozawa, Sakura; Shigefumi Yamasaki, Sakura, all of Japan

[73] Assignee: Fujikura ltd., Tokyo, Japan

[21] Appl. No.: 318,848

[22] PCT Filed: Feb. 24, 1994

[86] PCT No.: PCT/JP94/00300

§ 371 Date: Oct. 25, 1994

§ 102(e) Date: Oct. 25, 1994

[87] PCT Pub. No.: WO94/17714

PCT Pub. Date: Sep. 1, 1994

[30] Foreign Application Priority Data

| Feb. 25, 1993 | [JP] | Japan | 5-037102 |
| Jun. 30, 1993 | [JP] | Japan | 5-162934 |
| Jul. 1, 1993 | [JP] | Japan | 5-163583 |
| Jul. 23, 1993 | [JP] | Japan | 5-183081 |
| Jul. 23, 1993 | [JP] | Japan | 5-183082 |
| Jul. 23, 1993 | [JP] | Japan | 5-183083 |

[51] Int. Cl.$^6$ ............................... G02B 6/10
[52] U.S. Cl. .............. 385/123; 385/126; 385/142; 385/144
[58] Field of Search .................. 385/11, 95, 96, 385/122, 123, 141, 142, 144, 126

[56] References Cited

U.S. PATENT DOCUMENTS

| 4,134,642 | 1/1979 | Kapron et al. | 385/126 |
| 4,295,739 | 10/1981 | Meltz et al. | 385/126 |
| 4,606,605 | 8/1986 | Ashkin et al. | 385/11 |

(List continued on next page.)

FOREIGN PATENT DOCUMENTS

| 0128024 | 12/1984 | European Pat. Off. |
| 0319319 | 7/1989 | European Pat. Off. |
| 2930759 | 3/1981 | Germany. |

OTHER PUBLICATIONS

Journal of Lightwave Technology, vol. LT–4, No. 8, Aug. 1986, pp. 1071–1084; "Polarization–maintaining fibers and their applications", J. Noda et al.

(List continued on next page.)

*Primary Examiner*—John Ngo
*Attorney, Agent, or Firm*—Sprung Kramer Schaefer & Briscoe

[57] ABSTRACT

The polarization-maintaining optical fiber 10 of the present invention is designed so that a plurality of core portions 12a,12b which have a high refractive index is provided in parallel along a single diameter direction in the cross section of the optical fiber, these core portions 12a,12b cooperating to propagate a single fundamental mode. In the production method for the polarization-maintaining optical fiber of the present invention, a plurality of holes 22 are formed longitudinally in parallel along a single diameter direction of a glass rod 21 having a low refractive index which forms the cladding, glass rods 23 for core use having a high refractive index which form the core portions are inserted into these holes 22, heating to form a unitary body is carried out, creating a preform which is then drawn. Further, the rare-earth-doped polarization-maintaining optical fiber of the present invention uses a rare earth element to dope the optical waveguide portion of the polarization-maintaining optical fiber, and can be employed in a light amplifier or laser oscillator. Moreover, the polarization-maintaining optical fiber coupler of the present invention is formed by bringing two or more polarization maintaining optical fibers into contact, heating, fusing and elongating them, and heating the vicinity of the connection point before and after connection.

18 Claims, 19 Drawing Sheets

U.S. PATENT DOCUMENTS

| | | | |
|---|---|---|---|
| 4,748,687 | 5/1988 | Auracher et al. | 372/99 |
| 4,950,318 | 8/1990 | Dyott | 385/96 |
| 5,129,019 | 7/1992 | Robberg et al. | 385/51 |
| 5,136,670 | 8/1992 | Shigematsu et al. | 385/42 |
| 5,237,630 | 8/1993 | Hogg et al. | 385/96 |

OTHER PUBLICATIONS

Yokohama et al, "Low excess loss conditions of polarization–maintaining fiber couplers", Applied Optics, V. 27, No. 23, Dec. 1989, pp. 4807–4813.

JP 1061076: Patent Abstracts of Japan, V. 13, No. 270 (Jun. 1989, Kiko Yoshio et al.

JP 02025806: Patent Abstracts of Japan, V. 14, No. 169 (Mar. 1990), Shigeru Tanaka.

Sasaki et al, "Fabrication of Polarization–Maintaining and Absorption–reducing Optical Fibers", Review of Electrical Communication Lab., V.31, No.3 (1983).

FIG. 2E  FIG. 2B  FIG. 2C
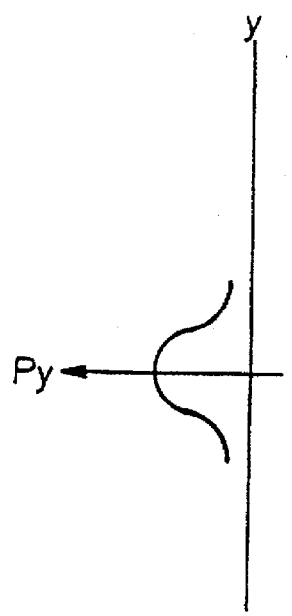
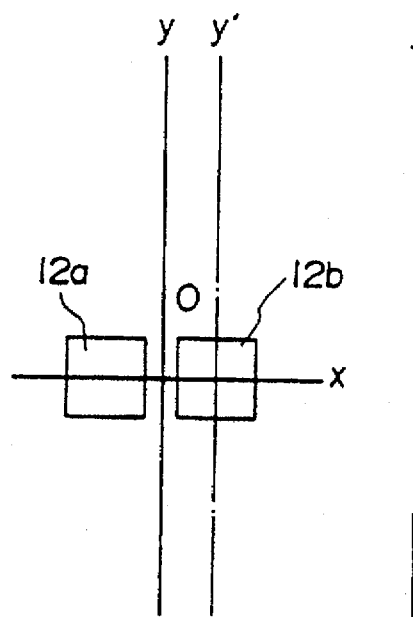
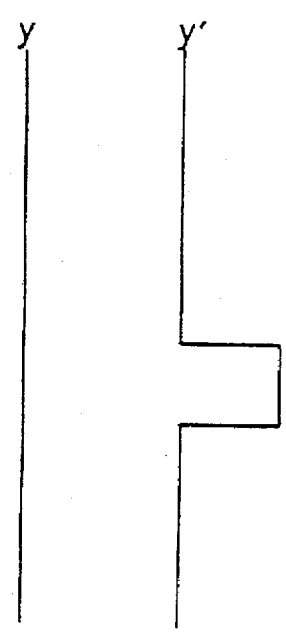
FIG. 2A
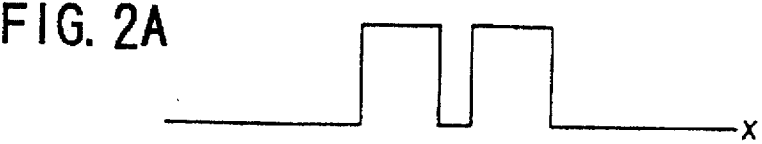
FIG. 2D
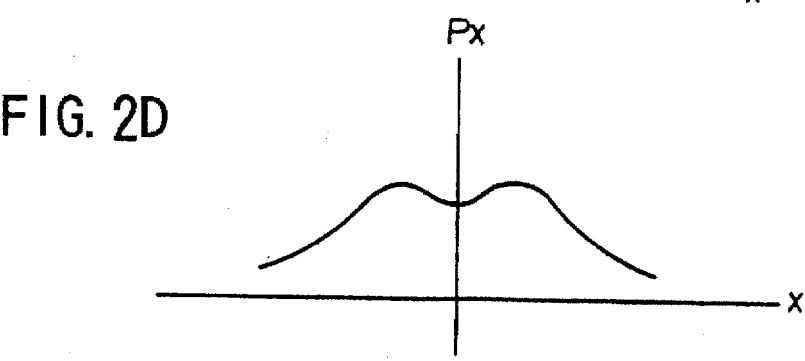

FIG. 17E    FIG. 17B    FIG. 17C
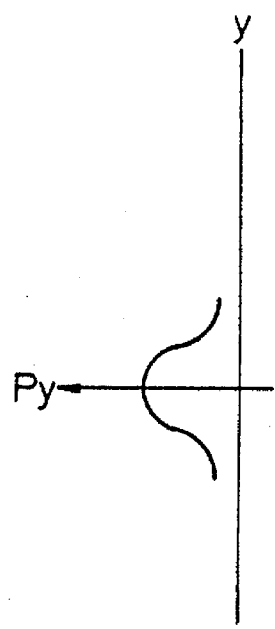
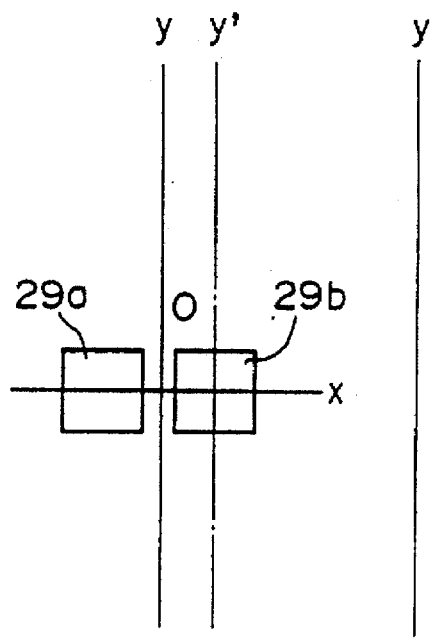
FIG. 17A
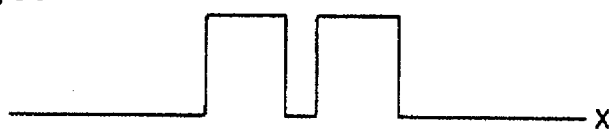
FIG. 17D
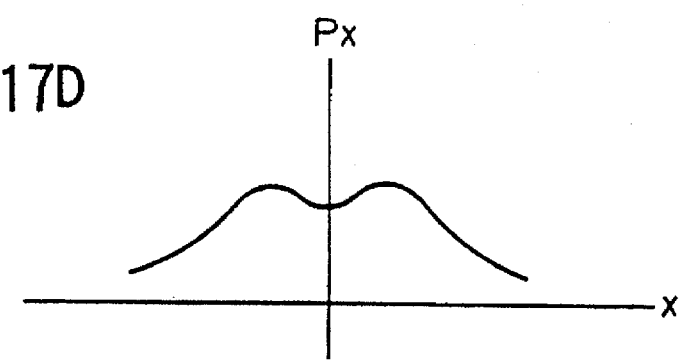

POLARIZED WAVE HOLDING OPTICAL FIBER, PRODUCTION METHOD THEREFOR, CONNECTION METHOD THEREFOR, OPTICAL AMPLIFIER, LASER OSCILLATOR AND POLARIZED WAVE HOLDING OPTICAL FIBER COUPLER

TECHNICAL FIELD

The present invention relates to a polarization-maintaining optical fiber, which can be used in a variety of optical fiber sensors or the like, to a method of production and to a connection method therefor, and to a light amplifier, a laser oscillator and a polarization-maintaining optical fiber coupler.

TECHNICAL BACKGROUND

Various polarization-maintaining optical fibers are conventionally known. FIGS. 22(a)–(d) show representative examples of conventional polarization-maintaining optical fibers. The polarization-maintaining optical fiber in FIG. 22(a) is referred to as an elliptical core type. This elliptical core type polarization-maintaining optical fiber lifts the degeneracy of two orthogonal polarization modes by breaking the circular symmetry of an ideal fiber with a circular core, and is designed so that the propagation constant between the modes may differ, and so that polarization may be maintained.

FIGS. 22(b), 22(c) and 22(d) show polarization maintaining optical fibers of types referred to, respectively, as an elliptical cladding, a bow-tie, and a PANDA type. These polarization-maintaining optical fibers are designed to lift the degeneracy of two polarization modes by introducing stress, which is not circular symmetrical with respect to the center of the optical fiber, into the fiber. In the figures, the numeral 1 indicates a core, 2 indicates a cladding, 3 indicates a jacket and 4 indicates stress-applying parts.

The production technology for these polarization-maintaining optical fibers is disclosed in a number of publications, one example being J. Noda et al. "Polarization-Maintaining Fibers and Their Applications", Journal of Lightwave Technology, vol. LT-4, No. 8, August 1986, pp. 1071–1089.

As is clear from the disclosure in this publication, the production method for a conventional polarization-maintaining optical fiber is not easy, so that the fiber is an extremely special fiber and has not been widely used.

For example, for the PANDA type polarization-maintaining optical fiber, which is now most often used, a glass preform in the form of a rod with a core/cladding structure for a single mode optical fiber is first produced using the VAD method or the like. In another process, the glass rod which forms the stress-applying part is formed using the VAD method or the like. In order to make the coefficient of thermal expansion of this glass rod large, it is doped with boron oxide ($B_2O_3$) in an amount close to 20% by weight. However, breakage occurs extremely easily in the quartz glass which has been doped with this much $B_2O_3$ due to its thermal contraction. Accordingly, considerable care must be taken during this process.

Next, a pair of holes are drilled in the aforementioned core/cladding glass preform, and the glass rods which form the stress-applying parts are inserted into these holes. The PANDA type polarization-maintaining optical fiber is obtained by drawing the assembly as composed at this stage.

In the conventional rod-in-tube method, a method wherein, after inserting the rods in a tube, the whole assembly is heated and collapsed to be a unitary structure, is employed. However, when this method is applied for the aforementioned glass rods which include the stress-applying parts, the collapsed glass rod break when cooled.

As a result, even for the PANDA fiber, which is one of the most ordinary polarization-maintaining optical fibers, the production method is not easy, requires considerable time, and costs high.

Further, in this production method, the process of drilling a plurality of holes in the glass rods which form the claddings is bothersome and, moreover, requires a special hole drilling device. In order to lower production costs, a greater simplification of the production process is necessary.

Accordingly, a subject of the present invention is obtaining a polarization-maintaining optical fiber which can be easily produced and supplied at a low cost, and a production method therefor.

With regard to a polarization-maintaining optical fiber coupler (hereinafter, referred to as simply "coupler") which carries out light branching, mixing, wave division and wave multiplexing between a plurality of optical fibers while maintaining the polarization of the propagated light, there are conventionally known those which employ polarization-maintaining optical fibers of the elliptical core type, the elliptical cladding type, the PANDA type or the like.

As shown in FIG. 23, such polarization-maintaining optical fiber couplers are produced by a method wherein two or more polarization-maintaining optical fibers 5,5 are contacted longitudinally at a certain portion, the portion is heated with an oxyhydrogen flame in this arrangement, and a coupled portion 6 is formed by fusing the contacted portion while at the same time gently elongating it.

It is noted here that this production method is not limited to a polarization-maintaining optical fiber, but may be widely applied to general single mode optical fibers, and is technically established as a known technology.

However, the following problems exist in couplers of this type.

First, the production of the polarization-maintaining optical fiber itself is difficult, incurring high production costs. Second, the degree of freedom in the type of coupling of the coupler is limited. Third, in order to obtain a coupler with an efficiently low excessive loss, etc., it becomes necessary to change the structure, design or production method of the polarization-maintaining optical fiber itself.

Accordingly, a subject of the present invention is obtaining a coupler which can be easily produced, for which there is a high degree of freedom for the type of coupling of the coupler, and which has excellent characteristics.

Further, another subject of the present invention is obtaining a method wherein a polarization-maintaining optical fiber obtained by the present invention as described above is fusion connected with a low loss.

A single mode optical fiber in which such rare earth elements as neodymium (Nd), erbium (Er), samarium (Sm), or the like is doped in the core is known conventionally, and is employed in optical fiber amplifiers and laser oscillators.

In these optical fiber amplifiers and laser oscillators, it is frequently necessary to control the polarization of the output light. In order to do so, a conventional polarization-maintaining optical fiber with a rare-earth-doped core may be employed. However, as for the actual production of the polarization-maintaining optical fiber with a rare-earthdoped core, forming the polarization-maintaining optical fiber itself is difficult, a step for doping the core with the rare earth element must be added, so that much effort is required and production costs become high.

Accordingly, another subject of the present invention is obtaining a rare-earth-doped polarization-maintaining optical fiber which can be produced easily and supplied at a low cost, a production method therefor, and a light amplifier and a laser oscillator.

DISCLOSURE OF THE INVENTION

The polarization-maintaining optical fiber of the present invention is designed so that a plurality of core portions each of which has a high refractive index may be provided in parallel along a single diameter direction in the cross section of the optical fiber, these core portions cooperating to propagate a single fundamental mode. By changing a core, which conventionally formed a single region, into a plurality of regions, that is to say, by dividing the core portion with narrow intervals therebetween, it is possible to generate an extremely high degree of flatness or ellipticity as a waveguide, and thereby to obtain excellent polarization-maintaining characteristics. Further, the production is simplified.

Further, the production method for the polarization-maintaining optical fiber according to the present invention is a method for producing the aforementioned polarization-maintaining optical fiber, wherein the glass rods, which form the plurality of core portions and each of which has a core main body, are inserted into a hole in the glass rod, which forms the cladding and has a single hole therein, and the composite preform is heated to be a unitary structure, and is drawn. As a result, it is possible to produce the aforementioned polarization-maintaining optical fiber with ease and efficiency, and, moreover, at a reasonable cost.

The polarization-maintaining optical fiber coupler of the present invention is formed by contacting two or more of the aforementioned polarization-maintaining optical fibers longitudinally, and then heating, fusing and elongating them.

In the polarization-maintaining optical fiber connection method of the present invention, when fusion connecting the polarization-maintaining optical fibers of the present invention, the vicinity of the connection point is heated either before or after connection. Accordingly, it is possible to eliminate inconsistencies in the pattern of the modal power distributions at the connection between the present invention's polarization-maintaining optical fibers, which have a shape of an elliptical distribution of the electric field. Thus, it is also possible to reduce connection loss.

Moreover, in the rare-earth-doped polarization-maintaining optical fiber according to the present invention, a plurality of core portions each of which has a high refractive index are aligned along a single diameter direction in the cross section of the optical fiber. These core portions cooperate to propagate a single fundamental mode and to perform a polarization-maintaining function. Either the core portions or the cladding portions, which are interposed between core portions and which are in an area having a low refractive index, or both are doped with a rare earth element. As a result, the polarization-maintaining characteristics are excellent, there is a superior light amplification function, and it is easy to align the axes of the polarization when fusion connecting.

Further, because the light amplifier and laser oscillator of the present invention employ the aforementioned rare-earth-doped polarization-maintaining optical fiber, they output an output light having excellent polarization characteristics.

BRIEF DESCRIPTION OF THE DRAWINGS

FIG. 2(a) shows the refractive-index distribution along the direction of the x axis of the polarization-maintaining optical fiber of the present invention.

FIG. 2(b) shows the refractive-index distribution along the direction of the y axis of the polarization-maintaining optical fiber of the present invention.

FIG. 2(c) shows the refractive-index distribution along the direction of the y' axis of the polarization-maintaining optical fiber of the present invention.

FIG. 2(d) shows the mode distribution along the direction of the x axis of the polarization-maintaining optical fiber of the present invention.

FIG. 2(e) shows the mode distribution along the direction of the y axis of the polarization-maintaining optical fiber of the present invention.

FIG. 17(a) shows the refractive-index distribution along the direction of the x axis for the rare-earth-doped polarization-maintaining optical fiber of the present invention.

FIG. 17(b) shows the refractive-index distribution along the direction of the y axis for the rare-earth-doped polarization-maintaining optical fiber of the present invention.

FIG. 17(c) shows the refractive-index distribution along the direction of the y' axis for the rare-earth-doped polarization-maintaining optical fiber of the present invention.

FIG. 17(d) shows the mode distribution along the direction of the x axis for the rare-earth-doped polarization-maintaining optical fiber of the present invention.

FIG. 17(e) shows the mode distribution along the direction of the y axis for the rare-earth-doped polarization-maintaining optical fiber of the present invention.

PREFERRED EMBODIMENTS OF THE PRESENT INVENTION

[Polarization-Maintaining Optical Fiber]

A detailed explanation of the polarization-maintaining optical fiber of the present invention follows below.

FIGS. 1(a)–(f) all show examples of a polarization-maintaining optical fiber according to the present invention.

Figure 1A:
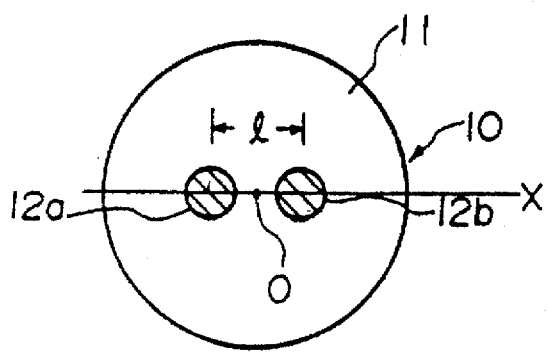
FIG. 1(a) is a cross-sectional view showing an example of the polarization-maintaining optical fiber of the present invention.

The polarization-maintaining optical fiber 10 shown in FIG. 1(a) comprises a cladding 11, which is made from a glass having a low refractive index and which is circular in cross-section, and two core portions 12a,12b, which are made from a glass having a high refractive index and which are also circular in cross-section.

Core portions 12a,12b are disposed symmetrically with respect to a plane which includes the center axis O of the optical fiber 10. In other words, two core portions 12a,12b are disposed in array along a single diameter direction (x axis) of optical fiber 10.

The diameters of core portions 12a,12b are identical, and are selected to be in the range of 2~10 μm, depending upon the operational wavelength and the relative refractive index difference for core portions 12a,12b. Moreover, the separation between one core portion, 12a, and the other core portion, 12b, is represented by the measurement l for the distance between the centers of each core portion 12a,12b shown in FIG. 1(a), and is selected to be within the range of 0.5~3 times that of the radii of core portions 12a,12b. Further, the relative refractive index difference for core portions 12a,12b and cladding 11 is in the range of 0.15~3.0%.

Pure quartz, fluorine-doped quartz or the like may be employed as the glass which forms the cladding 11. Germanium-oxide-doped quartz, pure quartz, phosphorus-oxide-doped quartz, or the like may be used as the glass which forms core portions 12a,12b. The outer diameter of the cladding 11 is ordinarily 125 µm, however, it may take on a value of 80 µm, for example, as necessary.

Figure 1B:
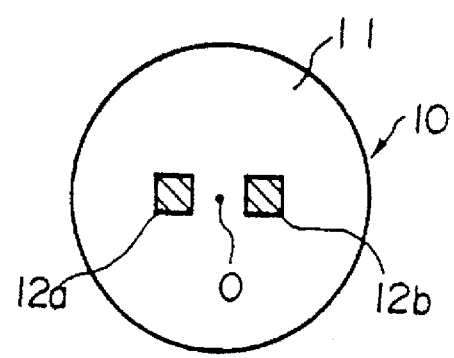
FIG. 1(b) is a cross-sectional view showing an example of the polarization-maintaining optical fiber of the present invention.

The example shown in FIG. 1(b) differs from that of FIG. 1(a), in that the core portions 12a,12b are both quadrate shape in cross-section. The quadrate shape may be square or rectangular. The long side of core portions 12a,12b is in the range of approximately 2~10 µm, and the short side is in the range of approximately 2~10 µm. Interval l is in the range of 1 to 3 times as large as the length of the aforementioned short side.

Figure 1C:
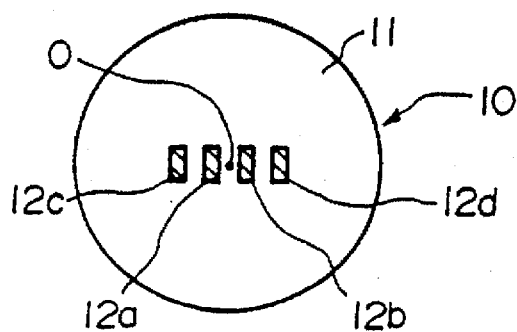
FIG. 1(c) is a cross-sectional view showing an example of the polarization-maintaining optical fiber of the present invention.

The example shown in FIG. 1(c) comprises four quadrate core portions 12a, 12b, 12c and 12d. These four core portions effectively cooperate to propagate a single fundamental mode.

Figure 1D:
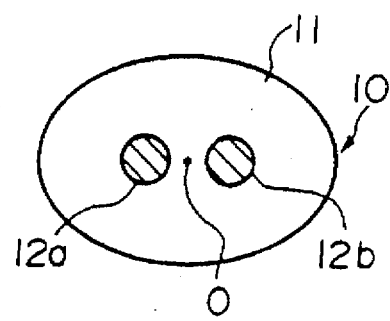
FIG. 1(d) is a cross-sectional view showing an example of the polarization-maintaining optical fiber of the present invention.
Figure 1E:
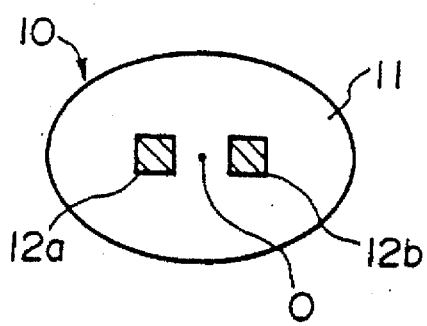
FIG. 1(e) is a cross-sectional view showing an example of the polarization-maintaining optical fiber of the present invention.
Figure 1F:
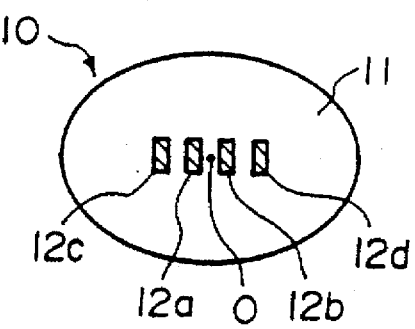
FIG. 1(f) is a cross-sectional view showing an example of the polarization-maintaining optical fiber of the present invention.

Further, in the examples shown in FIGS. 1(d) through 1(f), cladding 11 is elliptical in cross-section, the direction of the major axis thereof being identical to the direction of disposition of core portions 12a, 12b (12c, 12d).

FIGS. 2(a)~(e) diagrammatically shows a refractive-index distribution for the polarization-maintaining fiber shown in FIG. 1(b), and the mode distribution for the fundamental mode which propagates through the core portions 12a,12b. FIG. 2(a) is a refractive-index distribution along the x axis; 2(b) is a refractive-index distribution along the y axis; 2(c) is a refractive-index distribution along the y' axis; 2(d) is a mode distribution along the x axis; and 2(e) is a mode distribution along the y axis.

From these figures, the mode distribution along the x axis extends to the portion of the cladding 11 between core portions 12a,12b, and is considerably different from the refractive-index distribution. Moreover, the mode distribution along the y axis is almost identical to a mode distribution for a conventional single mode fiber.

The difference of the mode distributions along the x axis and the y axis breaks circular symmetry, which reduces geometrical birefringence Bg in the fiber and enables the fiber to maintain polarization.

Furthermore, if glass having a larger coefficient of thermal expansion than that of the glass which forms the cladding 11 is used for the glass which forms core portions 12a,12b in the polarization-maintaining optical fiber of the present invention, then the anisotropic internal stress arises in the core portions 12a,12b in the drawing process. This internal stress induces stress birefringence Bs. As a result of this as well, then, polarization maintenance arises. Because this stress-induced birefringence Bs adds to the geometrical birefringence Bg, the total birefringence B becomes large.

FIGS. 3(a)~(d) all show other examples of the polarization-maintaining optical fibers of the present invention.

Figure 3A:
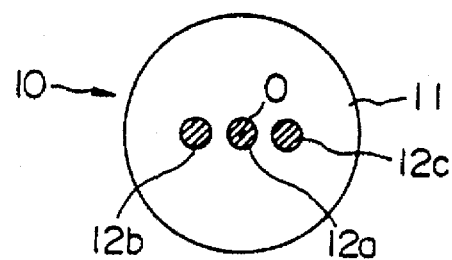
FIG. 3(a) is a cross-sectional view showing an example of the polarization-maintaining optical fiber of the present invention.

The polarization-maintaining optical fiber shown in FIG. 3(a) has an odd number (three) of core portions 12a, 12b and 12c. The center core portion, 12a, is disposed so that its center may coincide with the center axis O of the optical fiber. The separation between the core portions 12a, 12b and 12c, and the relative refractive index difference between cladding 11 and the core portions 12a, 12b and 12c are as in the previous example.

Figure 3B:
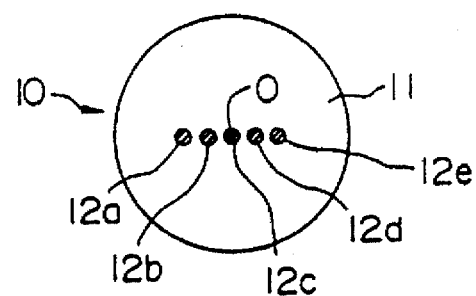
FIG. 3(b) is a cross-sectional view showing an example of the polarization-maintaining optical fiber of the present invention.

Moreover, in this example, it is not absolutely necessary for the center core portion 12a and the center axis O of the fiber to coincide. Further, the shape of each core portion may be quadrate as in the previous example, and the shape of the cladding 11 in cross-section may be elliptical. As shown in FIG. 3(b), the polarization-maintaining optical fiber of the present invention may also have five core portions, 12a, 12b, 12c, 12d and 12e.

Figure 3C:
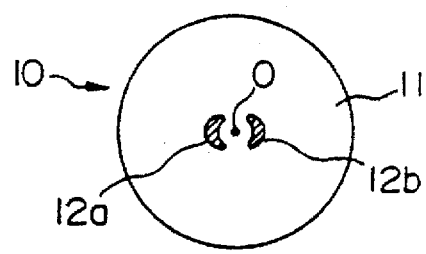
FIG. 3(c) is a cross-sectional view showing an example of the polarization-maintaining optical fiber of the present invention.
Figure 3D:
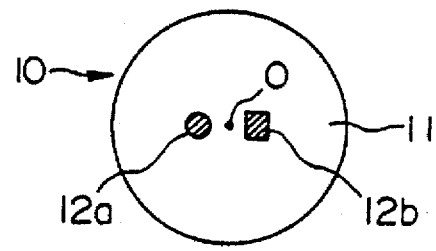
FIG. 3(d) is a cross-sectional view showing an example of the polarization-maintaining optical fiber of the present invention.

In the example shown in FIG. 3(c), the core portions 12a,12b are shaped like gently curving commas in cross-section. Thus, in this invention, it is not necessary to employ shapes which are symmetrical in cross-section of a core portion, such as an ellipse, quadrate or the like. Further, as shown in FIG. 3(d), it is also possible for each of the core portions 12a,12b, respectively, to have different cross-sectional shapes.

Figure 4A:
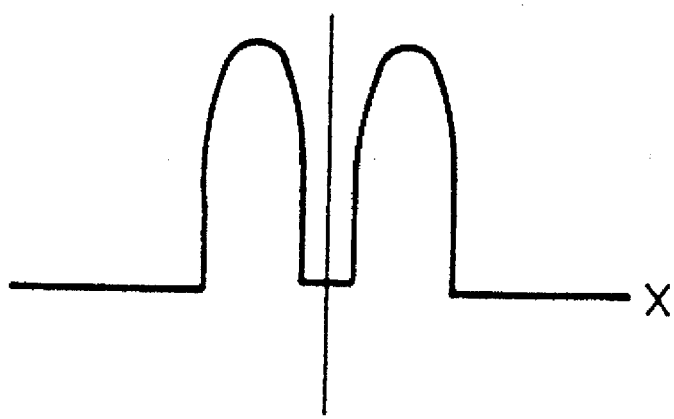
FIG. 4(a) shows the refractive-index distribution of another example of the polarization-maintaining optical fiber of the present invention.
Figure 4B:
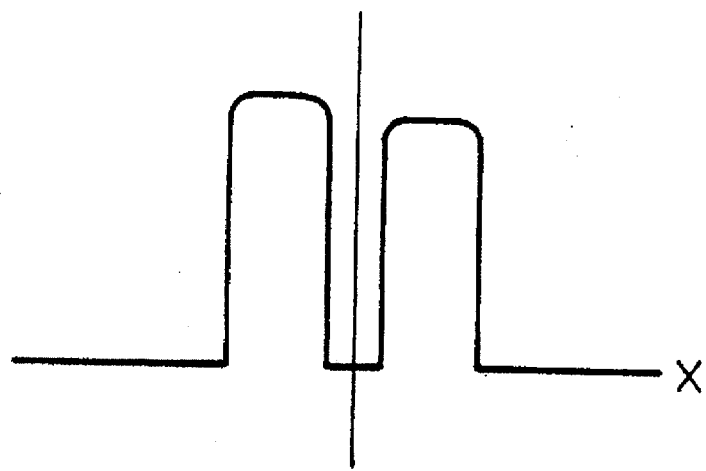
FIG. 4(b) shows the refractive-index distribution of another example of the polarization-maintaining optical fiber of the present invention.

Moreover, it is not necessary for the refractive-index distribution of one core portion to be identical as shown in FIG. 2(a). For example, as shown in FIG. 4(a), a refractive-index distribution which is peaked may also be employed. As shown in FIG. 4(b), the relative refractive index difference may be slightly different between the core portions.

[EXAMPLE 1]

Using the VAD method, quartz glass bars to which $GeO_2$ had been added (glass rods for core use, diameter 30 mm, length 150 mm) were prepared. The concentration of $GeO_2$ with which these glass bars were doped was approximately 9% by weight, and the relative refractive index difference of the glass from a pure silica base was approximately 0.6%.

Next, these glass bars were elongated by heating at approximately 1700° C. in a heating furnace to glass rods of diameter 5 mm which form the core portions.

A pure silica glass rod, which forms the cladding and which has an outer diameter of 40 mm and a length of 200 mm, was prepared separately. Two insertion holes of diameter 5.3 mm were drilled symmetrically with respect to the center axis of the glass rod, at a interval of 2.5 mm therebetween. Next, the aforementioned $GeO_2$-doped quartz glass bars were inserted respectively into these insertion holes, heated and collapsed to obtain the intermediate preform of the dimensions shown in FIG. 5.

Figure 6:
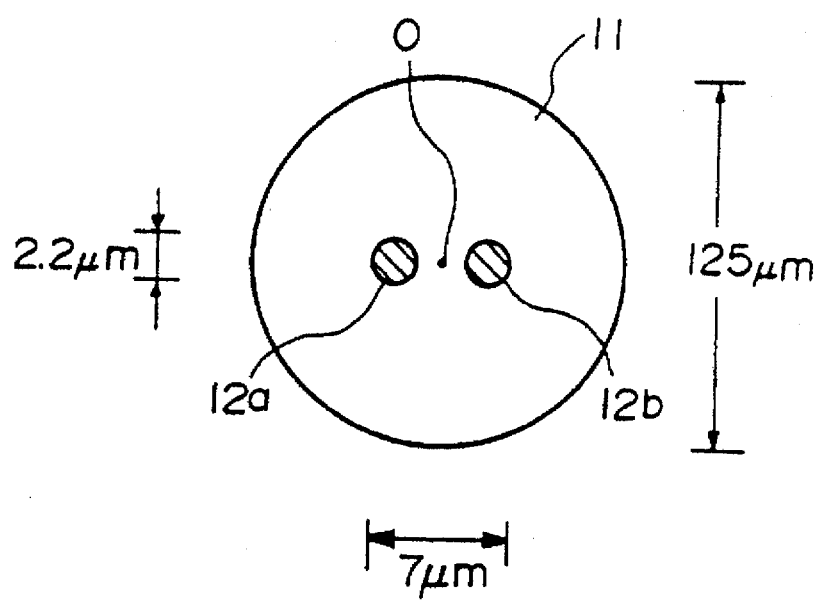
FIG. 6 is a cross-sectional view of the polarization-maintaining optical fiber obtained in Example 1 of the present invention.

This intermediate preform was heated and elongated, and quartz glass which forms the cladding was formed to the peripheral surface thereof using a known outside vapor phase deposition method, thus the final preform was formed. This was drawn into an optical fiber having the structure shown in FIG. 6.

A slight secondary mode propagation over a short transmission distance was observed for the thus-obtained optical fiber. However, it was confirmed that only the fundamental mode could propagate effectively. The data for this optical fiber is shown in FIG. 1. Further, when it is necessary to remove the non-essential secondary mode, a very short single mode fiber may be inserted as a mode filter.

TABLE 1

| | | |
|---|---|---|
| cutoff wavelength | | approx. 1.5 µm |
| wavelength of light used | | 1.55 µm |
| mode field diameter | long diameter | approx. 7 µm |
| | short diameter | approx. 5.5 µm |
| modal birefringence B | | approx. $1 \times 10^{-4}$ |
| $B = \dfrac{\|\beta x - \beta y\|}{K_0}$ | | $\beta x$: propagation constant along x axis |
| | | $\beta y$: propagation constant along y axis |
| $K_0 = 2\pi/\lambda$ | | $\lambda$: wavelength |

The optical fiber obtained in this way has sufficient characteristics as a polarization-maintaining optical fiber, and its production is carried out easily as described above.

[EXAMPLE 2]

Using the VAD method, GeO$_2$-doped quartz glass bars (diameter 7 mm) which form the core portions were prepared. The concentration of doped GeO$_2$ was approximately 30% by weight, and the relative refractive index difference from a pure silica base was approximately 2%.

Moreover, a fluorine-doped quartz glass bar (diameter 50 mm) which forms the cladding was prepared. The relative refractive index difference from a pure silica base was approximately −0.3%.

Next, three insertion holes of diameter approximately 7.3 mm were drilled in the glass bar which forms the cladding. The interval of hole centers was set to be 10 mm, and the center of one insertion hole was designed to coincide with the center axis of the glass rod for core use.

The glass rods for core use which form the core portions were inserted into these insertion holes, heated, and collapsed to form the intermediate preform.

Next, this intermediate preform was heated and elongated, and, using the rod-in-tube method, a cladding of sufficient thickness was formed to the outer periphery thereof to form the final preform. This preform was formed by elongation to form the cladding. The preform was drawn to obtain an optical fiber having the structure as shown in FIG. 3(a).

The diameters of the core portions of this optical fiber were approximately 1.5 µm, and the distance between the centers of the core portions was approximately 2.1 µm. The cladding diameter (fiber diameter) was 80 µm, and the relative refractive index difference between the core portions and the cladding was approximately 2.3%.

The optical characteristics of the obtained optical fiber are as shown in Table 2. From the table it may be understood that the optical fiber possesses excellent polarization-maintaining characteristics.

TABLE 2

| | | |
|---|---|---|
| cutoff wavelength | | 1.52 µm |
| transferred wavelength | | 1.55 µm |
| mode field diameter | long diameter | approx. 12 µm |
| | short diameter | approx. 6 µm |
| modal index of birefringence B | | approx. $3 \times 10^{-4}$ |
| crosstalk between polarization modes (fiber length 2 m) | | approx. 35 dB |

[Method of Production for Polarization-Maintaining Fiber]

An explanation will now be made of the method for producing the polarization-maintaining optical fiber according to the present invention.

Figure 7:
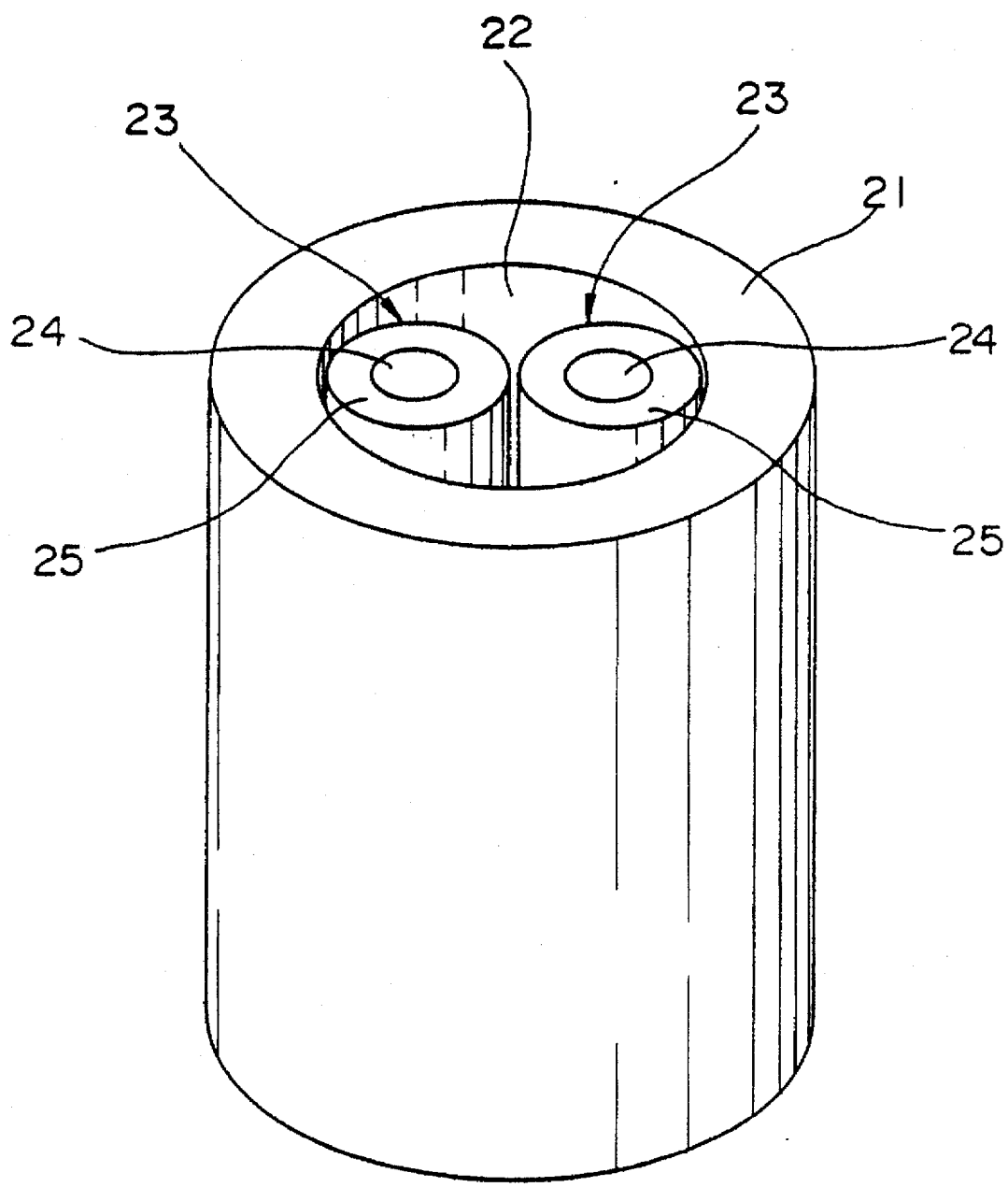
FIG. 7 is a schematic perspective view showing an example of the production method of this invention.

FIG. 7 shows an example of this production method. First a columnar glass rod 21, which forms the cladding, is prepared. A single circular insertion hole 22 is formed concentrically at the center of this glass rod 21. This glass rod 21 comprises pure quartz, fluorine-doped quartz or the like. A high purity quartz glass pipe available commercially may be used as is, or a glass rod, synthesized by a CVD method such as the known VAD method or the like, to which a hole drilling process has been carried out may be employed.

In a separate process, a glass rod 23 for core use is prepared. This glass rod 23 for core use comprises a two layer structure. The center portion thereof forms a core main body 24 having a high refractive index, which form the core portions. The outer periphery thereof comprises an outer periphery portion 25 having a low refractive index.

The outer periphery portion 25 comprises pure quartz glass, fluorine-doped quartz glass or the like. The refractive index thereof is identical to the refractive index of the aforementioned glass rod 21 for cladding use. Further, the core main body 24 comprises germanium-doped quartz glass, pure quartz glass or the like. The core main body 24 has a refractive index higher than that of the outer periphery portion 25 such that the relative refractive index difference from the level of the outer periphery portion 25 is +0.15~3.0%.

The ratio of the outer diameters of the core main body 24 to that of outer periphery portion 25 is such that the outer diameter of outer periphery portion 25 is at least 1.5 times larger, and preferably 3 times larger, than that of the core main body 24.

Further, the production of this glass rod 23 for core use may be carried out in the same manner as the production of a preform for a single mode optical fiber using, for example, the known VAD method.

As many glass rods 23 for core use as core portions are prepared.

Figure 5:
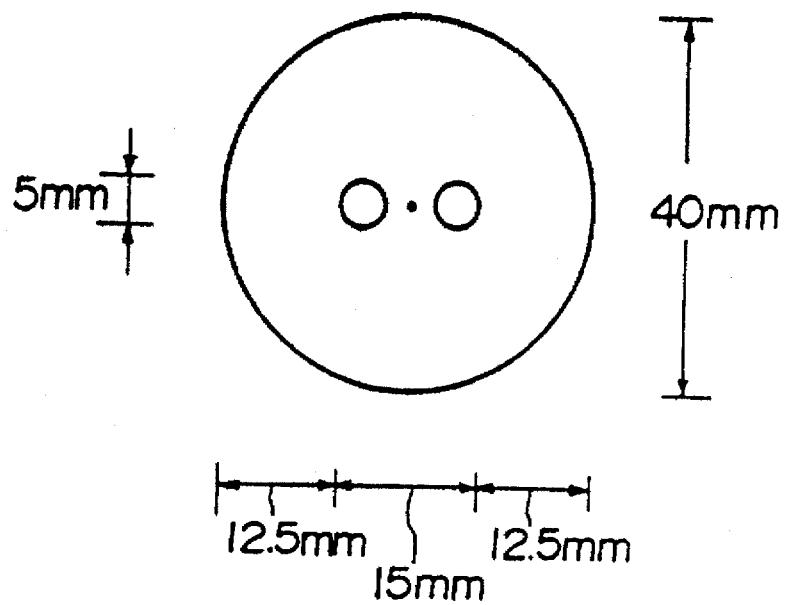
FIG. 5 shows the intermediate preform in Example 1 of the present invention.

Next, as shown in FIG. 5, a plurality (two) of glass rods 23 . . . for core use are aligned in a single direction and, being held in this state, are inserted into the insertion holes 22 of the glass rod 21 for cladding use. Through an appropriate means, the glass rods 23 . . . for core use are affixed to the glass rod 21 for cladding use. There is, at this point, a slight gap in the insertion hole 22, however, this does not present a problem in particular.

Next, the assembly of glass rods 23 for core use and glass rod 21 for cladding use is heated, forming the plurality of glass rods 23 for core use and a glass rod 21 for cladding use into a unitary body (collapsing) as a final preform. Then, by drawing from an end thereof, the objective polarization-maintaining optical fiber is obtained. Further, drawing may be performed after further forming a glass which forms the additional cladding to the outer peripheral surface of this preform using an outside vapor phase deposition method as necessary.

Figure 8:
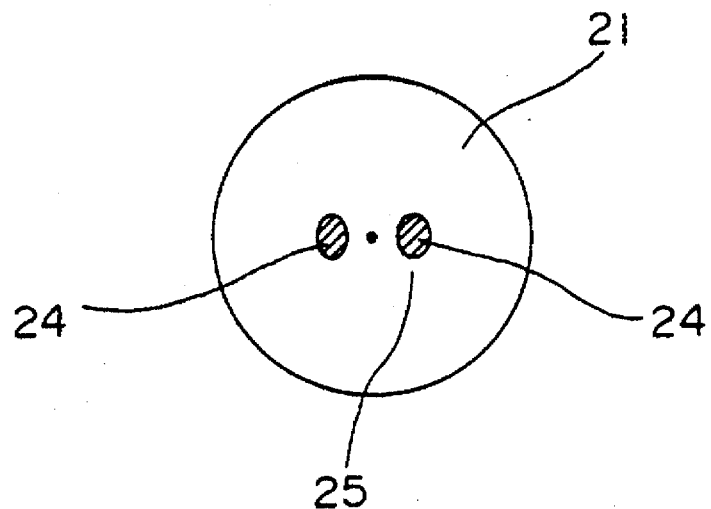
FIG. 8 is a schematic cross-sectional view of the preform in one example of the production method of this invention.

FIG. 8 shows the cross-sectional surface of the preform after forming the unitary body. Because the refractive indices for the outer periphery portion 25 of the glass rod 23 for core use and the glass of glass rod 21 for cladding use are identical, it is not possible to distinguish therebetween. Moreover, due to the transfer of melted glass which occurs in order to fill the aforementioned gap in insertion hole 22, the shape in cross-section of the core main body 24 of the glass rod 23 for core use deforms from a circle to an ellipse.

However, while such a shape deformation of the core main body 24 does induce a slight variation for the polarization-maintaining characteristics of the obtained polarization-maintaining optical fiber, there is almost no effect on its optical properties.

In other words, in this new type of polarization-maintaining optical fiber, even if the refractive-index distribution of the plurality of core portions deforms slightly from its ideal shape, there is almost no change in the power distribution of the propagation mode. As a result, even if the core portion is elliptical in shape as shown in FIG. 8, it shows optical characteristics which do not differ from the case where the core portion is circular.

In such a production method, the production of the glass rod 23 for core use is the same as the production of a preform used for a single mode optical fiber. Moreover, because there may be only one insertion hole 22 in the glass rod 21 for cladding use, the work is easy. Because it is possible to appropriate a commercially available high purity quartz glass pipe as is, there are no technical difficulties encountered, and production can be carried out extremely easily. Thus production costs are made inexpensive.

Figure 9:
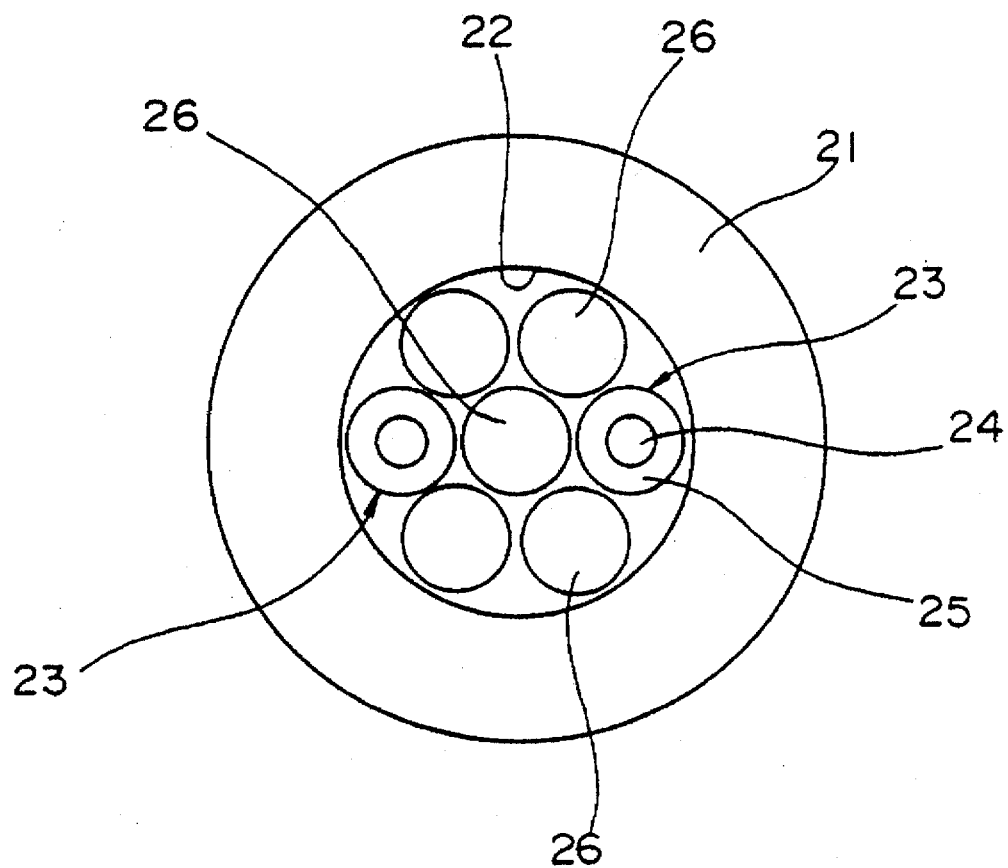
FIG. 9 is a schematic plane view showing another example of the production method of this invention.

FIG. 9 shows another example of the production method of the present invention. As shown in the figure, a plurality (two) of glass rods 23 for core use and a plurality (five) of dummy glass rods 26 are disposed bundled together, and inserted into insertion hole 22 of glass rod 21 for cladding use. The entire assembly is then heated, forming a unitary body (collapses), and drawing is carried out. The glass material forming the aforementioned dummy glass rods 26 is selected to be identical to the glass material which forms glass rod 21 for cladding use, and to have the same refractive index.

In this method, the proportion of space occupied by the gap in insertion hole 22 is smaller as compared to the previous example. For this reason, the deformation in shape of the core main body 24 of glass rod 23 for core use becomes small, and a core portion having a cross-sectional shape which is close to circular can be obtained.

Moreover, as another production method, there is a method wherein a plurality of glass rods for core use, these to form the core portions, are disposed with a predetermined interval therebetween, and fixed together at both ends thereof. With this as the starting substrate, a glass soot which forms the cladding is deposited using an outside vapor phase deposition method. After making a transparent glass and thus forming the preform, this preform is drawn.

As explained above, by means of the present invention, it becomes possible to produce extremely easily a polarization-maintaining optical fiber which has a simple structure and, moreover, for which the polarization-maintaining capability is excellent. Further, there is no need to use a large concentration of dopant as in the conventional PANDA type fiber, thus the cost for raw materials is kept low.

Further, in the production method for the polarization-maintaining optical fiber of the present invention, a glass rod for core use having a core main body which forms a plurality of core portions is simultaneously inserted into a hole in the glass rod for cladding use which forms the cladding and which has a single hole therein, and, after heating to form a unitary body, is drawn. For this reason, this new type of polarization-maintaining optical fiber can be produced simply, with good efficiency at a low price.

Concrete examples follow below.

[EXAMPLE 3]

Using the VAD method, a glass preform for core use was formed. This then was elongated by heating, producing two glass rods for core use. The outer diameter thereof was 2 mm, while the length was 200 mm. The outer diameter of the core main body was 1 mm. The core main body comprised $GeO_2$-doped quartz glass, while the outer periphery portion comprised quartz glass. The relative refractive index difference was approximately 1.6%.

In a separate process, a commercially available high purity quartz glass pipe (inner diameter 5 mm, outer diameter 50 mm) was prepared as the glass rod for cladding use. Two glass rods for core use were aligned, inserted into and disposed within an insertion hole in the thus prepared glass rod for cladding use. This was then formed into a unitary body by heating at 1200° C., yielding the preform.

This preform was drawn from one end thereof, obtaining a polarization-maintaining optical fiber.

This polarization-maintaining optical fiber displayed the following optical characteristics.

| core portion-cladding comparative refractive index difference | | approx. 1.6% |
| --- | --- | --- |
| shape of core portion | short diameter | approx. 1.7 µm |
| | long diameter | approx. 2.2 µm |
| distance between centers of core portions | | approx. 2 µm |
| modal birefringence B | | $1 \times 10^{-4}$ |
| wavelength used | | 1.3 µm |
| cutoff wavelength | | approx. 1 µm |

[EXAMPLE 4]

Two glass rods for core use were prepared in the same manner as in the preceding Example 3, with the exception that the outer diameter was 2.5 mm, the length was 200 mm, and the outer diameter of the core main body was 1.25 mm.

In a separate process, using the VAD method, five dummy glass rods were prepared, the entirety thereof comprising quartz glass, and having an outer diameter of 2.5 mm and a length of 200 mm.

Further, a commercially available high purity quartz glass pipe (inner diameter 8 mm, outer diameter 60 mm) was prepared as the glass rod for cladding use.

The glass rods for core use and the dummy glass rods were disposed as shown in FIG. 7 and bundled together. This was inserted into the insertion hole of the aforementioned pipe, disposed therein and heated to form a unitary body. Drawing was then carried out to obtain a polarization-maintaining optical fiber.

The core portion of the obtained polarization-maintaining optical fiber had a long diameter of approximately 2.0 µm and a short diameter of approximately 1.9 µm, and was very close to circular in shape. The optical characteristics thereof were almost identical to those of concrete Example 3 above. It was determined that the cutoff wavelength had become slightly longer.

[Polarization-Maintaining Optical Fiber Coupler]

The coupler of the present invention is formed employing the aforementioned polarization-maintaining optical fiber.

The coupler is formed by the aforementioned known method wherein two or more polarization-maintaining optical fibers are contacted, heated, fused and elongated.

Figure 10A:
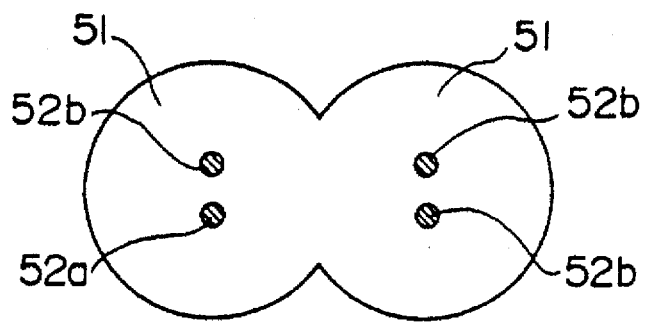
FIG. 10(a) is a cross-sectional view showing an example of the polarization-maintaining optical fiber coupler of the present invention.
Figure 10B:
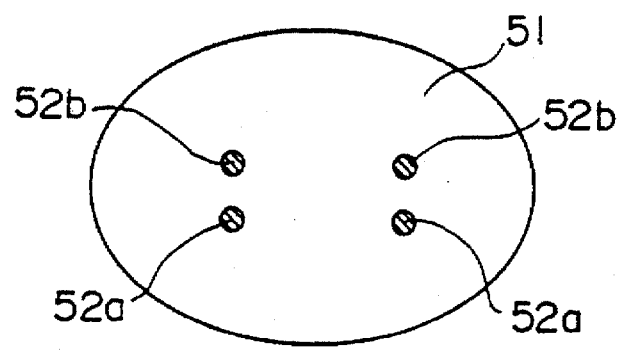
FIG. 10(b) is a cross-sectional view showing an example of the polarization-maintaining optical fiber coupler of the present invention.
Figure 10C:
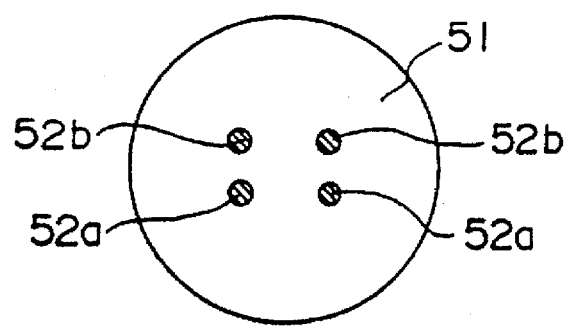
FIG. 10(c) is a cross-sectional view showing an example of the polarization-maintaining optical fiber coupler of the present invention.

FIGS. 10(a)~(c) all show examples of the coupled portion of a coupler obtained using two polarization-maintaining optical fibers of the present invention. These figures show three different degrees of coupling wherein the respective planes of polarization are held in parallel, the distance between the centers of the core portions 52a,52b differ, and the degree of fusion differs. The degree of fusion is appropriately selected giving consideration to the wavelength characteristics, etc., of the degree of coupling of the coupler.

Figure 11A:
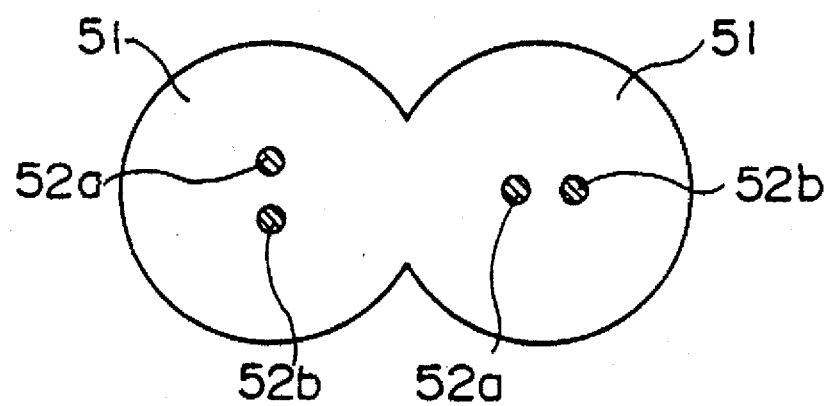
FIG. 11(a) is a cross-sectional view showing another example of the polarization-maintaining optical fiber coupler of the present invention.

FIGS. 11(a) and (b) show another example of a type of coupling for the coupler of the present invention. The planes of polarization are held so as to be perpendicular, and the degree of fusion has been changed.

This type of coupling could not be realized in the conventional polarization-maintaining optical fibers such as PANDA type fibers or bow-tie type fibers because of the presence of the stress-applying part.

Figure 12:
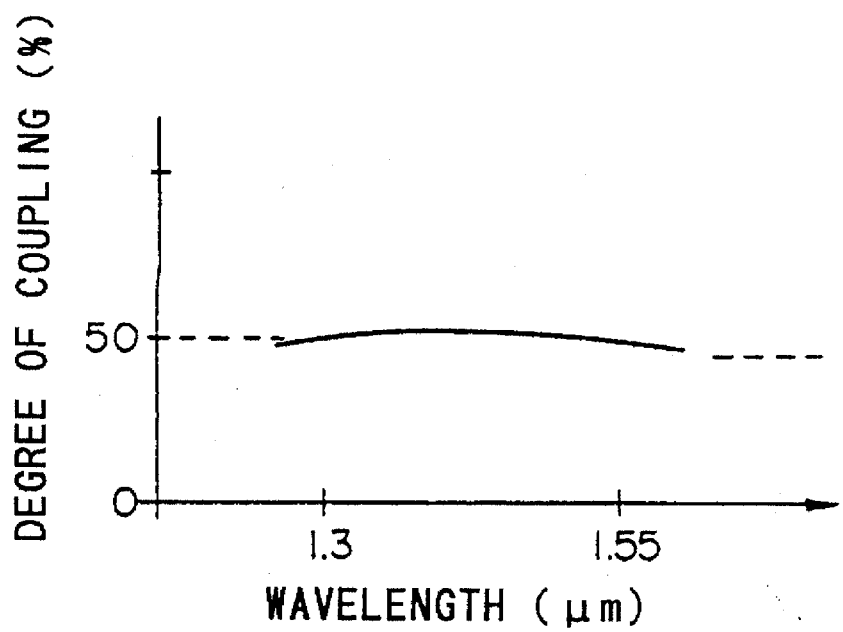
FIG. 12 is a graph showing the relationship between wavelength and coupling ratio for an example of the coupler of the present invention.

Further, in the coupler of the present invention, the refractive indices of the employed polarization-maintaining optical fibers may be mutually different. By means of such a combination, it is possible to obtain a coupler having a small dependence on wavelength, exhibiting uniform wavelength characteristics with respect to the degree of coupling as shown in FIG. 12.

Figure 11B:
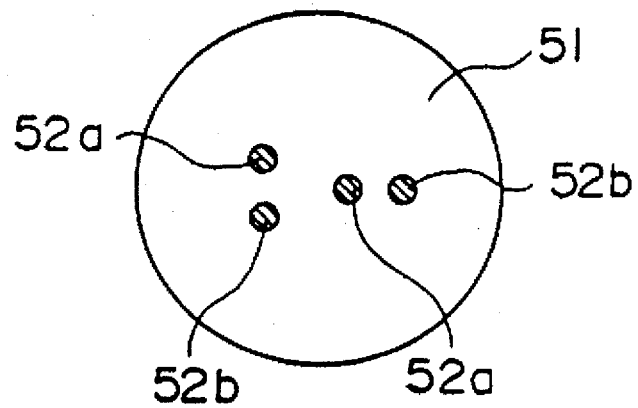
FIG. 11(b) is a cross-sectional view showing another example of the polarization-maintaining optical fiber coupler of the present invention.

Because there is not a complicated refractive-index distribution in the cladding of the employed polarization-maintaining optical fiber, such a coupler experiences very low loss. Further, as shown in FIGS. 10 and 11, because the cross-sectional shape of the coupled portion may be freely selected, the wavelength characteristics of the coupler may be made to have a large degree of freedom.

Because the polarization-maintaining optical fiber coupler of the present invention is formed in this way using a polarization-maintaining optical fiber, it has low loss, and, moreover, permits a high degree of freedom with regard to the type of coupling, the degree of coupling, and the characteristics of the wavelength. Thus, a variety of articles can be produced. Further, the production of the polarization-maintaining optical fiber itself is easy, thus allowing its provision to be accomplished at low cost.

A concrete example follows below.

[EXAMPLE 5]

The following was employed as the polarization-maintaining optical fiber.

| | |
|---|---|
| relative refractive index difference between core portion and cladding | approx. 1.6% |
| number of core portions | 2 |
| shape of the core portions | circular, diameter approx. 2.0 μm |
| distance between centers of core portions | approx. 2.2 μm |
| modal birefringence B | approx. $1 \times 10^{-4}$ |
| wavelength used | 1.3 μm |
| cutoff wavelength | approx. 1.2 μm |
| cladding diameter | 80 μm |

Two of these polarization-maintaining optical fibers were contacted so that the planes of polarization thereof were mutually parallel, and a coupler was formed by heating with an oxyhydrogen flame, fusing, and elongating.

The obtained coupler had a distance between core portions of approximately 40 μm, a degree of coupling of 10%, and an excessive loss of 0.1 dB (wavelength used: 1.27~1.34 μm).

Further, when the degree of fusion was made large, and the distance between the core portions was made 25 μm, then the degree of coupling changed to 50%, and the excessive loss to 0.15 dB (wavelength used: 1.27~1.34 μm).

[Connection Method for Polarization-Maintaining Optical Fiber]

Next, an explanation will be made of the connection method for the polarization-maintaining optical fiber of the present invention. In this polarization-maintaining optical fiber connection method, when fusion connecting the polarization-maintaining optical fibers of the present invention, the vicinity of the connection point is heated before or after connection.

As compared to conventional polarization-maintaining optical fibers such as a PANDA type fiber or the like, the polarization-maintaining optical fiber of the present invention in particular offers the advantage of having a simple structure and being extremely easy to produce. Thus, it can be provided at low cost.

Figure 13:
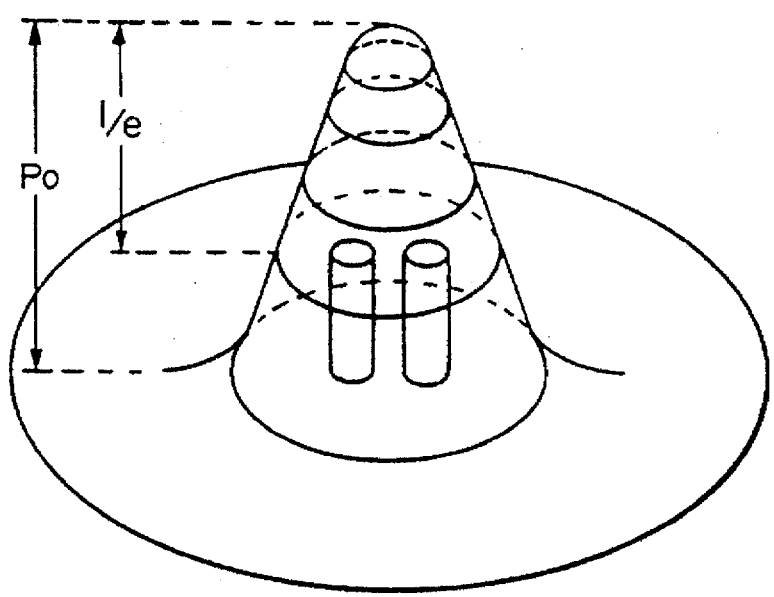
FIG. 13 shows the distribution of the electric field strength of the propagation mode for the polarization-maintaining optical fiber in the polarization-maintaining optical fiber connection method of the present invention.

As shown in FIG. 13, when viewed in cross-section on a plane perpendicular to the direction of light propagation, the mode distribution of the propagation mode of this polarization-maintaining optical fiber is elliptical in shape. The degree of ellipticity does not take on a specific value, but the degree of freedom is large.

Even when using this polarization-maintaining optical fiber as a transmission line, a fiber optical part or the like, it is not possible to avoid connecting the fibers.

In the connection of these polarization-maintaining optical fibers, the mode distribution of the polarization-maintaining optical fiber itself is elliptical in shape, as described above. Moreover, the degree of ellipticity is not fixed. Accordingly, the mode distribution about the connection point may be discontinuous.

Figure 14A:
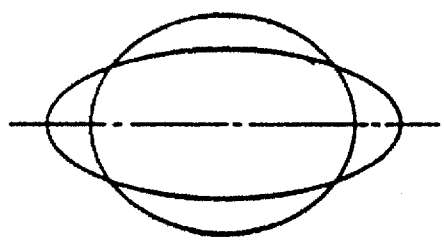
FIG. 14(a) diagrammatically shows the discontinuity of the distribution of the electric field of the modes for two polarization-maintaining optical fibers.
Figure 14B:
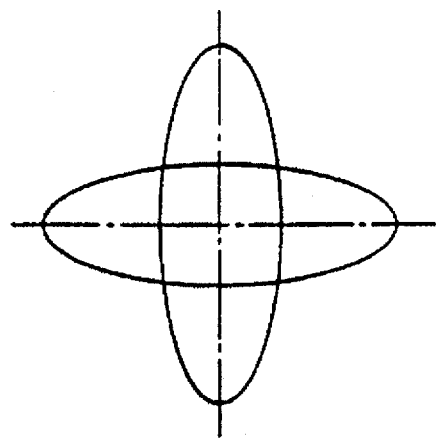
FIG. 14(b) diagrammatically shows the discontinuity of the distribution of the electric field of the modes for two polarization-maintaining optical fibers.
Figure 14C:
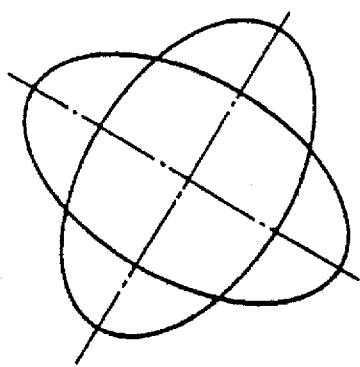
FIG. 14(c) diagrammatically shows the discontinuity of the distribution of the electric field of the modes for two polarization-maintaining optical fibers.
Figure 14D:
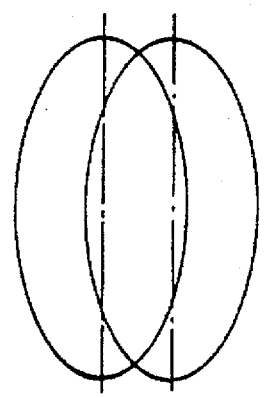
FIG. 14(d) diagrammatically shows the discontinuity of the distribution of the electric field of the modes for two polarization-maintaining optical fibers.

FIGS. 14(a)~(d) diagrammatically show the state of discontinuity of the distribution of the electric field of the modes for two of the fibers at such a connection point. FIG. 14(a) shows the case where the planes of polarization are congruent, but the degree of ellipticity of the mode distributions is different and in discontinuity. FIG. 14(b) shows the case where the planes of polarization are mutually perpendicular. FIG. 14(c) shows the case where the planes of polarization intersect at 45° angles respectively with the reference plane. FIG. 14(d) shows the case where the polarization planes deviate from being in parallel.

The discontinuity of the mode at connection points such as these naturally appears as connection loss. Further, in special applications, for example, carrying out connection in a depolarizer by inclining the polarization planes 45°, the connection loss at such connections further increases.

A polarization-maintaining optical fiber wherein the dopant added to the core portion which raises the refractive index is germanium oxide ($GeO_2$) is selected as the polarization-maintaining optical fiber which is the object of the connection method according to the present invention. As a result of heating, the germanium oxide diffuses rapidly from the glass of the core portion to the glass of the cladding portion. The refractive-index distribution for the core portions, that is, the shape of the mode distribution, deforms easily from an elliptical shape to a circular shape.

The heating region when heating encompasses an area of approximately 5~10 mm on either side of the center of the connection point. The heating temperature is in the range of 1500°~1700° C., and the heating time is between 5 to 12 seconds. The heating source is not limited in particular, but heating may be carried out using an arc discharge, oxyhydrogen flame or the like.

When heating prior to fusion connecting, the ends of the connection may be heated in accordance with the aforementioned conditions. Similarly, when heating after fusion, heating may be carried out in accordance with the aforementioned conditions, with the connection point as the center.

By heating the vicinity of the connection point in this way, the germanium oxide of the heated core portions disperses throughout the cladding. As a result, the cross-sectional shape of the mode distribution deforms from elliptical to almost circular. The discontinuity of the mode distribution between two fibers at a connection point is resolved, and connection loss is reduced.

In this way, by means of the polarization-maintaining optical fiber connection method of the present invention, the discongruity in the mode field shape at connections between polarization-maintaining optical fibers which have a shape of an elliptical distribution of the electric field is resolved, and connection loss can be reduced.

A concrete example follows below.

[EXAMPLE 6]

A polarization-maintaining optical fiber having two core portions and an outer diameter of 125 μm was prepared. The core portions comprised germanium-oxide-doped quartz glass, while the cladding comprised high purity quartz glass. The core portions had an outer diameter of approximately 2.5 μm, and a distance between centers of core portions of approximately 3.8 μm. The relative refractive index difference between the core portions and the cladding was approximately 0.7%. The wavelength employed was 1.55 μm.

The distribution of the electric field strength of the propagation mode for this polarization-maintaining optical fiber was elliptical in shape as shown in FIG. 13. The cross-sectional shape wherein the peak power (Po) in the distribution of the electric field strength became 1/e (where e is the natural log base) was oblong having a long diameter of 8 μm and a short diameter of 4 μm.

Approximately 5 meters of these polarization-maintaining optical fibers were cut off, and the respective severed ends extending approximately 7 mm were heated at approximately 1650° C. using a high frequency wave arc discharge. This heating was interrupted every 10 seconds, and the cross-sectional shape wherein the peak power became 1/e was measured. Changes were recognized in the cross-sectional shape according to heating time.

Figure 15:
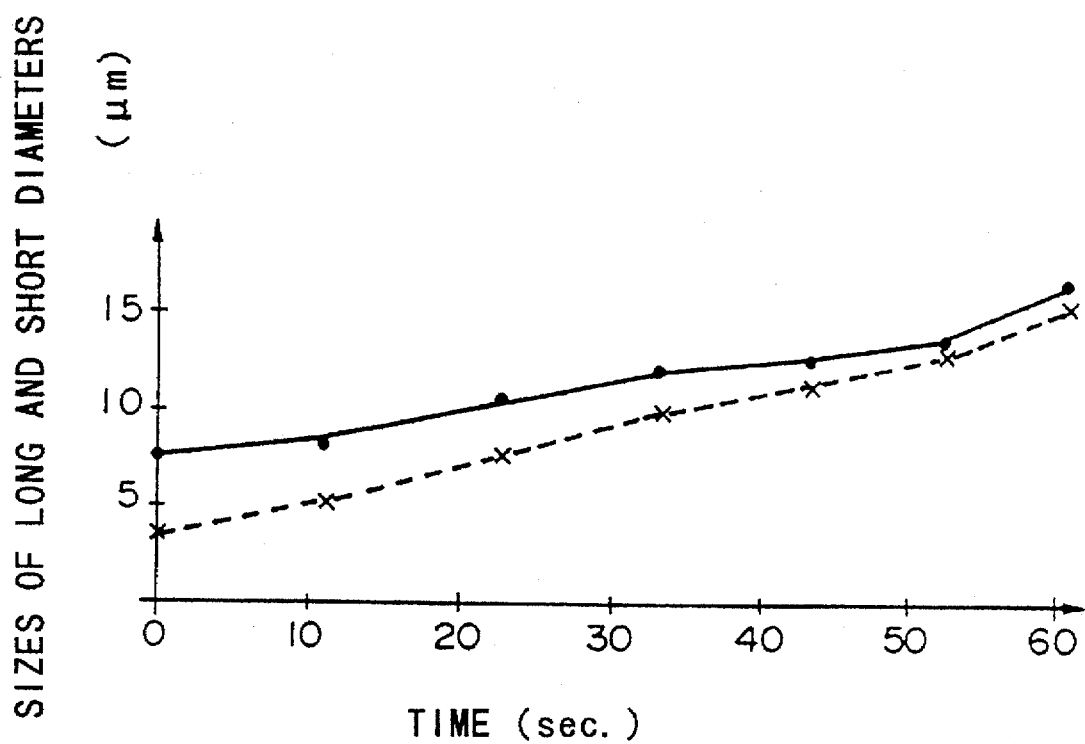
FIG. 15 is a graph showing change in the cross-sectional shape of the propagation mode due to heating.

FIG. 15 is a graph showing these results. The solid line in the graph shows change in the long diameter of the ellipse, while the broken line shows change in the short diameter. From the graph it may be seen that at a heating time of 60 seconds, the long diameter and the short diameter are almost identical, and that the elliptical shape has deformed to a circular shape of diameter approximately 15 μm.

Next, connection was carried out using a known fusion connecting method with the heating time set to 60 seconds, and the polarization planes intersecting at a 45° angle. In this case, the connection loss was 0.3 dB.

For comparative purposes, identical polarization-maintaining optical fibers were fusion connected in the same way without heating. A loss of 1.5 dB was determined.

Further, after fusion connecting identical polarization-maintaining optical fibers so that the polarization planes thereof intersected at a 45° angle, 5 mm on either side of the connection point were heated at 1600° C. for 60 seconds. The connection loss was 0.3 dB.

Further, it is noted here that the method of the present invention, wherein the vicinity of the connection point is heated when fusion heating, is also effective in the connection of other polarization-maintaining optical fibers which have germanium-oxide-doped cores.

In this way, by means of the polarization-maintaining optical fiber connection method of the present invention, the discongruity in the shape of the mode field at connections between polarization-maintaining optical fibers having a shape of elliptical distribution of the electric field is resolved, and connection loss can be reduced.

[Rare-Earth-doped Polarization-Maintaining Optical Fiber]

An explanation of the rare-earth-doped polarization-maintaining optical fiber according to the present invention will now be made. In this rare-earth-doped polarization-maintaining optical fiber, the core portions or the portions interposed between the core portions in the polarization-maintaining optical fiber of the present invention have been doped with a rare earth element.

FIGS. 16(a)~(f) all show examples of the rare-earth-doped polarization-maintaining optical fiber (hereinafter, abbreviated as REDPMF) of the present invention.

Figure 16A:
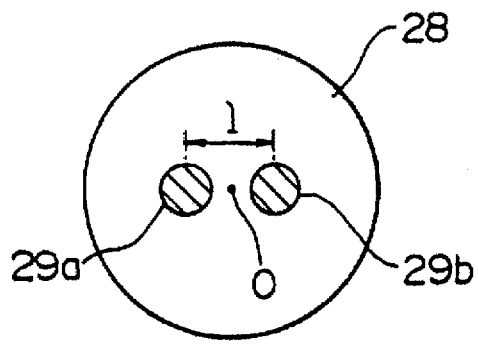
FIG. 16(a) is a cross-sectional view showing the rare-earth-doped polarization-maintaining optical fiber of the present invention.

The REDPMF shown in FIG. 16(a) is formed from a cladding 28 which is made from glass having a low refractive index and which is circular in cross-section, and two core portions 29a,29b which are made from glass having a high refractive index and which are circular in cross-section.

Core portions 29a,29b are disposed opposite to each other and in plane symmetry with respect to a plane which contacts the center axis O of the optical fiber and which extends along the direction of the center axis.

The respective diameters of core portions 29a,29b are identical, and are selected to be in the range of approximately 2~10 μm, depending on the wavelength employed and the relative refractive index difference for core portions 29a,29b. Moreover, the interval of space between one core portion, 29a, and the other core portion, 29b, is represented by the measurement l for the distance between the centers of each core portion 29a,29b shown in FIG. 16(a), and is selected to be within the range of 0.5~2.5 times that of the radii of core portions 29. Further, the relative refractive index difference for core portions 29a,29b and cladding 28 is in the range of 0.15~3.0%.

Pure quartz, fluorine-doped quartz or the like may be employed as the glass which forms the cladding 28. Glass wherein a rare earth element such as Nd, Er, Sm or the like, and, as necessary, $Al_2O_3$, has been added to germanium-oxide-doped quartz, pure quartz, phosphorus-oxide-doped quartz, or the like, may be used as the glass which forms core portions 29a,29b. The outer diameter of the cladding 28 is ordinarily 125 μm, however, this dimension may take on a value of, for example, 80 μm, as necessary. The doping concentration of the rare earth element is in the range of 300~2000 ppm (by weight), while the doping concentration of $Al_2O_3$ is in the range of 5~15 times the doping amount of the rare earth element.

Figure 16B:
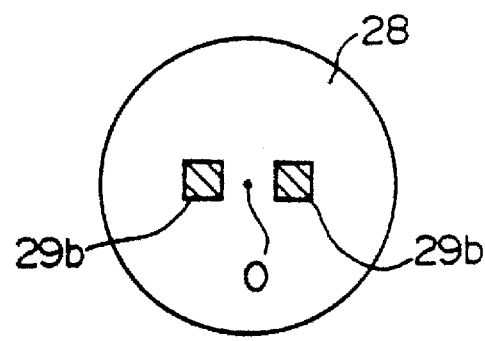
FIG. 16(b) is a cross-sectional view showing the rare-earth-doped polarization-maintaining optical fiber of the present invention.
Figure 16C:
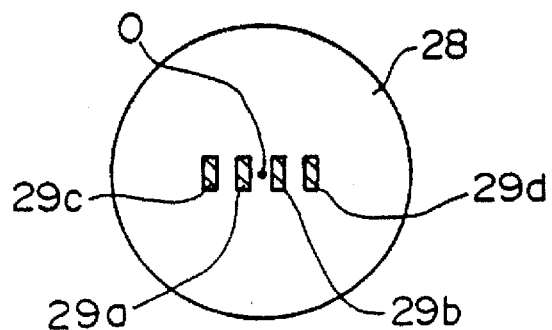
FIG. 16(c) is a cross-sectional view showing the rare-earth-doped polarization-maintaining optical fiber of the present invention.
Figure 16D:
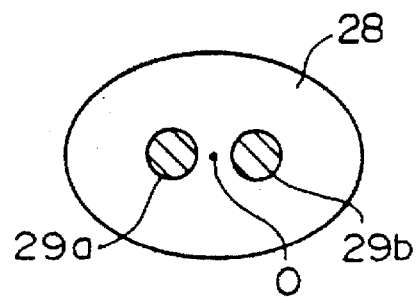
FIG. 16(d) is a cross-sectional view showing the rare-earth-doped polarization-maintaining optical fiber of the present invention.
Figure 16E:
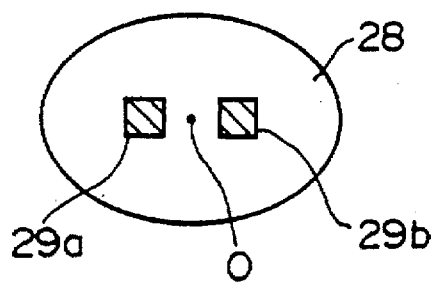
FIG. 16(e) is a cross-sectional view showing the rare-earth-doped polarization-maintaining optical fiber of the present invention.
Figure 16F:
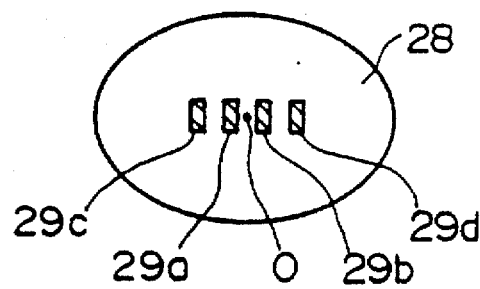
FIG. 16(f) is a cross-sectional view showing the rare-earth-doped polarization-maintaining optical fiber of the present invention.
Figure 18A:
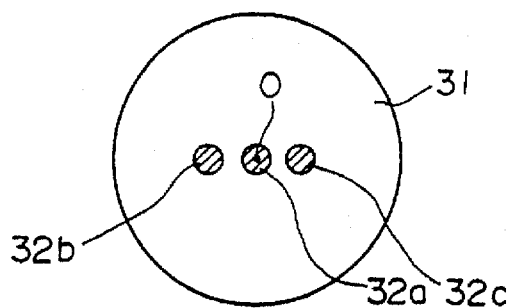
FIG. 18(a) is a cross-sectional view showing the rare-earth-doped polarization-maintaining optical fiber of the present invention.
Figure 18B:
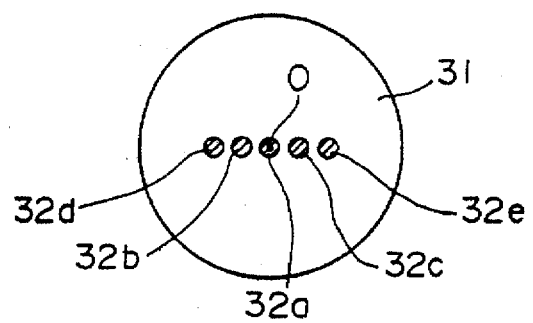
FIG. 18(b) is a cross-sectional view showing the rare-earth-doped polarization-maintaining optical fiber of the present invention.
Figure 18C:
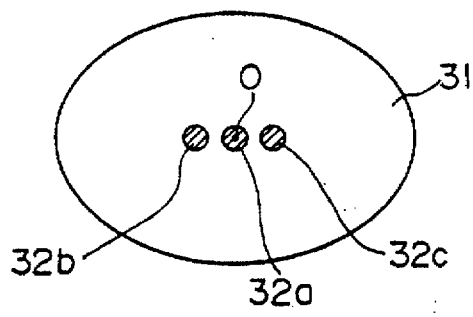
FIG. 18(c) is a cross-sectional view showing the rare-earth-doped polarization-maintaining optical fiber of the present invention.
Figure 18D:
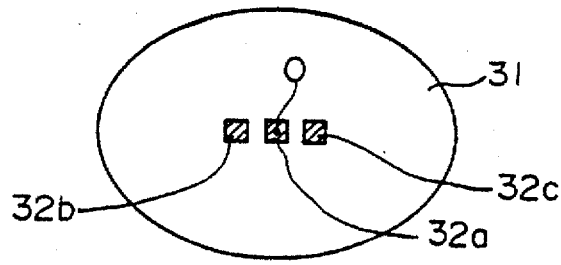
FIG. 18(d) is a cross-sectional view showing the rare-earth-doped polarization-maintaining optical fiber of the present invention.

The example shown in FIG. 16(b) differs from that of FIG. 16(a) in that the shape of the core portions 29a,29b are both quadrate in cross-section. The quadrate shape may also be square or rectangular. The long side of core portions 29a,29b is in the range of approximately 2~10 μm, and the short side is in the range of approximately 2~10 μm. Interval l is in the range of 0.5 to 2 times the length of the aforementioned short side. The example shown in FIG. 16(c) comprises four quadrate core portions 29a, 29b, 29c and 29d. These four core portions cooperate to propagate a single fundamental mode. Further, in the examples shown in FIGS. 16(d) through 16(f), cladding 28 is elliptical in cross-section, the direction of the major axis thereof being the same as the direction of disposition of core portions 29a, 29b (29c, 29d). In the examples in FIG. 16(b)-(f) as well, the doping with a rare earth element and, as necessary, $Al_2O_3$, of the core portions 29a, 29b, 29c . . . is the same.

FIG. 17 diagrammatically shows a refractive-index distribution for the polarization-maintaining optical fiber shown in FIG. 16(b), and the mode distribution for the fundamental mode which propagates core portions 29a,29b. FIG. 17(a) is a refractive-index distribution along the x axis; 17(b) is a refractive-index distribution along the y axis; 17(c) is a refractive-index distribution along the y' axis; 17(d) is a mode distribution along the x axis; and 17(e) is a mode distribution along the y axis. From these figures, the mode distribution along the x axis extends to the portion of the cladding 28 between core portions 29a,29b, and is considerably different from the refractive-index distribution. Moreover, the mode distribution along the y axis is almost identical to a mode distribution for a conventional single mode fiber.

For this reason, the mode distributions along the x axis and the y axis differ, showing nonaxisymmetry. As a result, a geometrical birefringence Bg is generated, giving rise to polarization maintainability.

Furthermore, if glass having a larger coefficient of thermal expansion than that of the glass which forms the cladding 28 is used for the glass which forms core portions 29a,29b in the REDPMF of the present invention, then nonaxisymmetric internal stress which is generated when drawing arises in core portions 29a,29b themselves. This internal stress induces stress birefringence Bs. As a result of this as well, then, polarization maintenance arises. Because this stress-induces birefringence Bs adds to the geometrical birefringence Bg, the total birefringence B becomes large.

FIGS. 18(a)-(d) all show other examples of the REDPMF of the present invention. The REDPMF shown in these examples differs from that shown in FIG. 1 in that it has an odd number (three) of core portions 32a, 32b and 32c. From among this odd number of core portions, the core portion in the center is positioned to be at the center axis O of the optical fiber. The other core portions are disposed symmetrically with respect to the center axis O. These core portions 32a, 32b, 32c . . . are of course doped with a rare earth element and, as necessary $Al_2O_3$.

However, as shown in FIG. 17(d), in the REDPMF of the present invention, optical power is propagated by the portion of the cladding which is in the region having a low refractive index interposed between core portions 29a,29b. Further, in conventional amplifiers which employ a rare-earth-doped optical fiber, it is known that the region doped with the rare earth should be limited to a region of strong optical power. It was from this fact that the idea of doping the portion of the cladding interposed between the plurality of core portions with a rare earth element and, as necessary, $Al_2O_3$, was conceived.

Figure 19A:
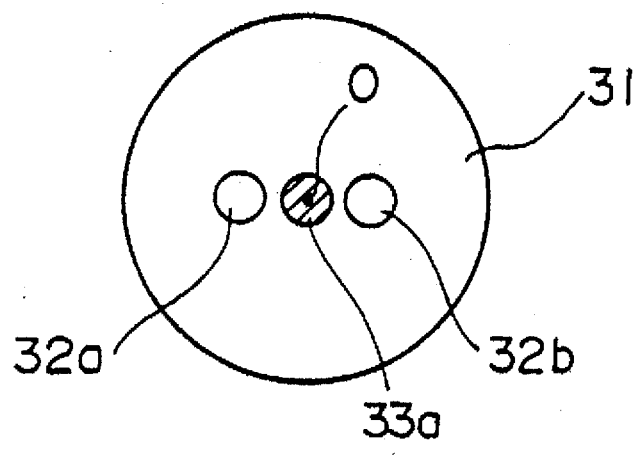
FIG. 19(a) is a cross-sectional view showing another example of the rare-earth-doped polarization-maintaining optical fiber of the present invention.

FIGS. 19(a) and (b) show examples wherein the region doped with the rare earth element forms the portion of the cladding interposed between core portions. The shaded portions 33a, 33b, 33c . . . show the region doped with the rare earth element. The doping concentrations of the rare earth element and $Al_2O_3$ added are as in the previous examples.

Figure 19B:
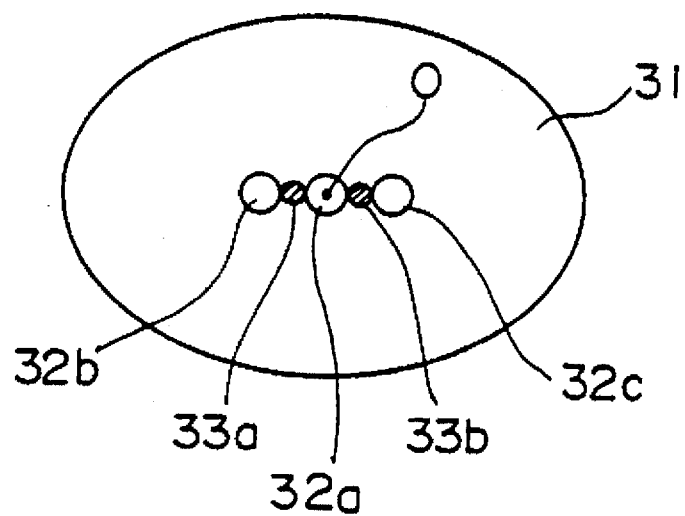
FIG. 19(b) is a cross-sectional view showing another example of the rare-earth-doped polarization-maintaining optical fiber of the present invention.

In the REDPMF shown in FIG. 19(a), the almost circular portion 33a interposed between the two circular portions 32a,32b has been doped with a rare earth element. In the example in FIG. 19(b), the two almost circular portions 33a,33b interposed between three core portions 32a,32b,32c have been doped with a rare earth element.

Further, in the REDPMF of the present invention, a rare earth element and, as necessary, $Al_2O_3$, may be used to dope the core portions 32a, 32b, 32c . . ., and both ends of the cladding portions 33a,33b . . . interposed between these core portions 32a, 32b, 32c . . . In a REDPMF of this type, concentrated doping of all the core portions 32a, 32b, 32c . . . and the cladding portion 33a, and the near core portion and cladding portion is effective.

Because its structure is simple and there is no stress-applying part, the production of a REDPMF of this type is easy, and its provision may be carried out at low cost. Moreover, because the refractive-index distribution differs largely at the parallel direction of the plurality of core portions (x direction) and at the direction perpendicular thereto (y direction), it is extremely easy to carry out the alignment of polarization axis wherein image processing is performed to the lateral visual image of fibers when fusion connecting polarization-maintaining optical fibers. In contrast, in conventional rare-earth-doped polarization-maintaining optical fibers wherein a rare earth element is used to dope the core of a PANDA type polarization-maintaining optical fiber which has a stress-applying part, the refractive index of the cladding is lowered and the relative refractive index difference between the core and the cladding is made extremely large at approximately 2%. For this reason, the relative refractive index difference between the stress-applying part and the cladding often falls below 0.05~0.3%, and such inconveniences arise as the alignment of the polarization axes from the image becoming difficult.

Figure 20:
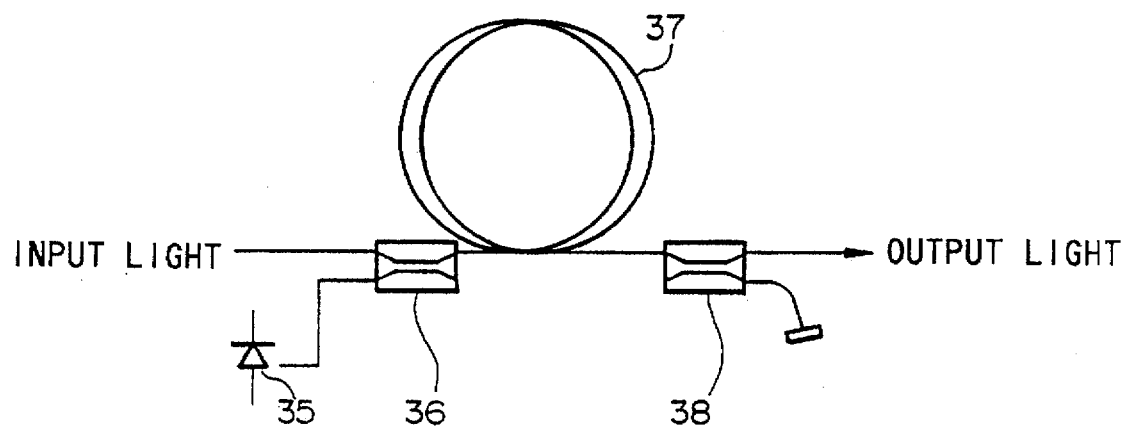
FIG. 20 is a structural diagram showing an example of the light amplifier of the present invention.

FIG. 20 shows an example of a light amplifier which employs the REDPMF of the present invention. In the figure, the numeral 35 is an excitation light source, 36 is a first optical coupler, 37 is the REDPMF, and 38 is a second coupler. The signal light is input to the first port of the first coupler 36, and the excitation light from an excitation light source 35 is input to the second port of the first coupler 36. The signal light and the excitation light are output from the third port of the first coupler 36, and input to the REDPMF. The signal light and the excitation light which were amplified in REDPMF 37 are input to the first port of the second coupler 38. The signal light and the excitation light are divided here, and the amplified signal light is output from the third port, while the remaining excitation light is output from the fourth port.

Figure 21:
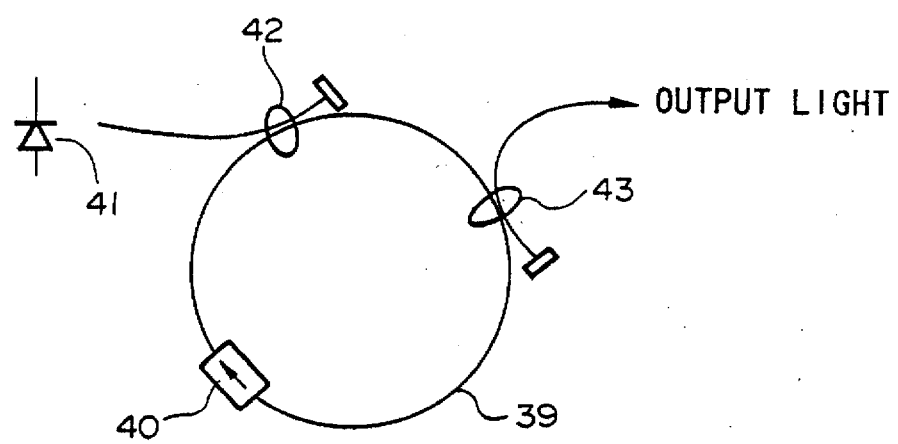
FIG. 21 is a structural diagram showing an example of the laser oscillator of the present invention.
Figure 22A:
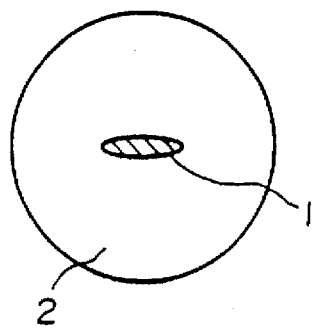
FIG. 22(a) is a cross-sectional view showing an example of a conventional polarization-maintaining optical fiber.
Figure 22B:
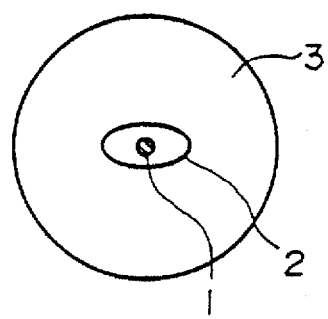
FIG. 22(b) is a cross-sectional view showing an example of a conventional polarization-maintaining optical fiber.
Figure 22C:
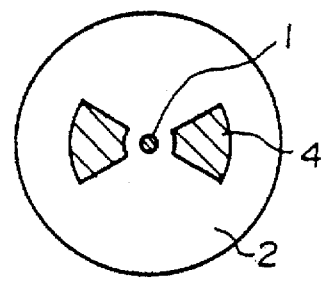
FIG. 22(c) is a cross-sectional view showing an example of a conventional polarization-maintaining optical fiber.
Figure 22D:
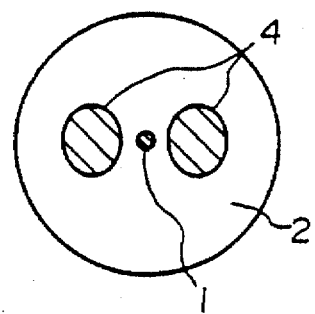
FIG. 22(d) is a cross-sectional view showing an example of a conventional polarization-maintaining optical fiber.
Figure 23:
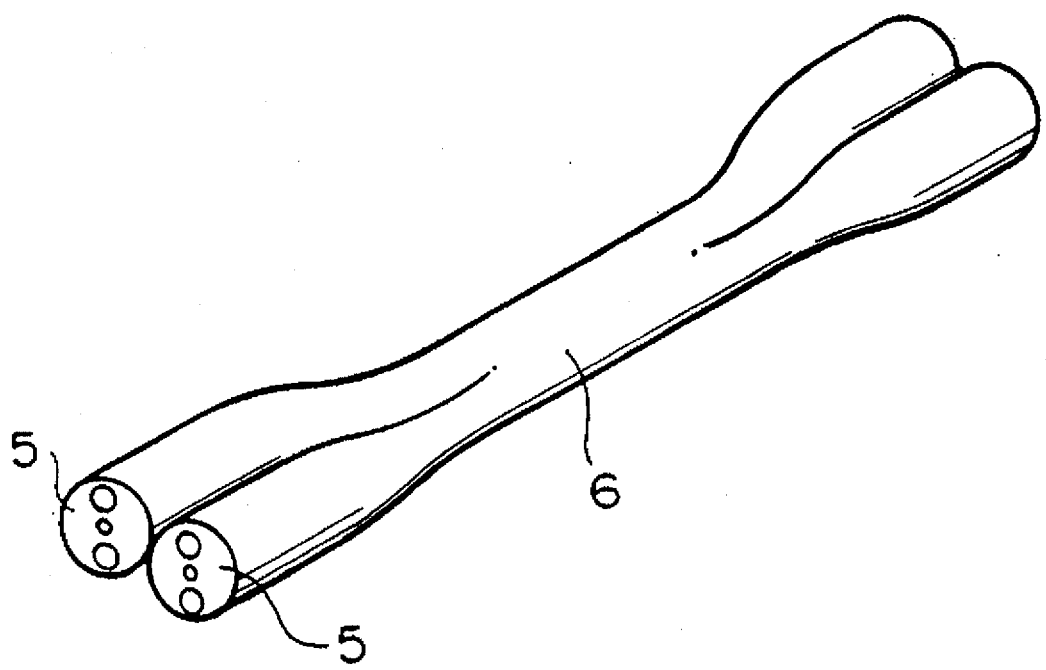
FIG. 23 is a perspective view showing a conventional coupler.

FIG. 21 shows an example of a laser oscillator which utilizes the REDPMF of the present invention. In the figure, the numeral 39 is a ring shaped resonator which wraps around the REDPMF, 40 is an isolator, 41 is an excitation light source, 42 is a multiple wavelength type first coupler, and 43 is a second coupler having a small degree of coupling. The excitation light from the excitation light source 41 is coupled and input from the first coupler 42 to the ring shaped resonator 39, and oscillated here. The oscillated light is output from the ring shaped resonator via the second coupler 43. Without coupling the oscillated light at the first coupler 42, 1~10% of the oscillated light is coupled at the second coupler 43, and is output to the outside.

An explanation will next be made of the method for producing the REDPMF of the present invention.

There are a variety of methods for this production method. As a first example, a columnar glass rod which forms the cladding is prepared. This glass rod comprises pure quartz, fluorine-doped quartz or the like, and is produced using a known method such as the VAD method or the like. Next, a plurality of holes for inserting the glass bars which form the core portions into this glass rod are mechanically formed. The inner surfaces of these holes undergo polishing. The drilling position of the holes is determined so as to have an analogous relationship with the obtained optical fiber.

In a separate process, the glass bars which form the core portions were formed. These glass bars employ a material wherein, after first forming a soot preform comprising germanium-oxide-doped quartz, pure quartz, or the like using the VAD method, etc., and then impregnating the soot preform with a rare earth element by soaking it in a rare-earth-element solution such as an aqueous hydrochloric acid solution of $ErCl_3$, the material is made into a transparent glass. The outer diameter of the glass bar is of course slightly smaller than the inner diameter of the aforementioned holes.

Next, the glass bars which form the core portions are inserted into the holes in the glass rod which forms the cladding, and the entire assembly is heated, collapsing it to form the preform. By then drawing the preform, the desired REDPMF is obtained. Moreover, as necessary, glass which forms the cladding may be further formed to the outer peripheral surface of the preform by means of an outside vapor phase deposition method, and then drawn.

Further, as another production method, a plurality of glass bars which form the core portions are disposed at predetermined intervals, and affixed at both ends thereof. With this as the starting substrate, a glass soot which forms the cladding is deposited using an outside vapor phase deposition method. After forming the preform by forming a transparent glass, the preform is then drawn. At this time, when depositing the glass soot which forms the cladding, if a method is employed when the soot is deposited between the plurality of glass bars which form the core portions wherein this assembly is soaked in a rare earth element solution as described above to impregnate the soot with the rare earth element, and then, once the transparent glass has been formed, the glass soot which forms the cladding is further deposited on top of this, then a REDPMF can be obtained having a rare-earth-doped portion of the cladding which is between core portions and which is in a region having a low refractive index. Further, if an assembly wherein the glass bars which form the core portions are doped with a rare earth element is employed, then a REDPMF having rare-earth-element-doped core portions and a rare-earth-element-doped cladding portion interposed therebetween can be obtained. As explained above, by means of the present invention, a REDPMF which has good polarization-maintaining characteristics, superior light amplification functions, and for which the alignment of the polarization axes when fusion connecting is easy, can be obtained. Further, because the structure is simple, production becomes easy and provision at a reasonable cost can be accomplished. Further, it becomes possible to obtain at a low cost a laser oscillator and light amplifier which output an output light having excellent polarization characteristics.

A concrete example follows below.

[EXAMPLE 7]

Using the VAD method, a $GeO_2$-doped quartz glass soot preform was formed. The concentration of $GeO_2$ with which this soot preform was doped was approximately 15 mole percent, and the relative refractive index difference with quartz was 1.5%. After impregnating this soot preform with an aqueous hydrochloric acid solution of erbium chloride and an aluminium chloride solution, a dehydration process was carried out and transparent glass was formed. By this process, a glass rod, which forms the core portion, is obtained wherein the concentration of erbium added is 800 ppm, and the concentration of aluminium added is 9000 ppm.

In a separate process, a fluorine-doped quartz glass rod which forms the cladding is formed using the VAD method. The relative refractive index difference between this rod and quartz glass was −0.4%. Two insertion holes were drilled symmetrically about the center axis of the rod, and underwent optic polishing. Then, the aforementioned glass bars which form the core portions were inserted respectively into these insertion holes, and heated to form a unitary body, thus obtaining an intermediate preform. This intermediate preform was heated and elongated, and quartz glass which forms the cladding was further formed to the outer surface thereof using a known outside vapor phase deposition method to create the preform. This was drawn, obtaining a REDPMF having the structure as shown in FIG. 16(a). The diameter of one core portion of the REDPMF was 2.0 μm, the relative refractive index difference was 1.9%, the distance between the centers of the core portions was 2.8 μm, the index of birefringence was $1.0 \times 10^{-4}$, and the cutoff wavelength for the secondary modes was approximately 1.2 μm. At a wavelength of 1.3 μm, it was possible to operate this REDPMF as a polarization-maintaining optical fiber.

The light amplifier shown in FIG. 20 was formed employing this REDPMF. After setting the length of REDPMF to 30 m, the wavelength of the excitation light to 0.98 μm, the output thereof to 30 mW, and inputting a signal of wavelength 1.553 μm, light amplification operations where the gain was 25 dB and the noise figure was 3 dB were performed.

[EXAMPLE 8]

Using the VAD method, a $GeO_2$-doped quartz glass bar was formed. The concentration of $GeO_2$ doped was approximately 15 mole percent, and the relative refractive index difference with quartz was 1.5%. This glass bar was heated and elongated to yield the glass rod which forms the core portion.

In a separate process, a pure quartz glass preform was formed using the VAD method. In the same manner as in Example 1, erbium and aluminium were added, and a glass bar was formed wherein the doping concentration of erbium was approximately 1000 ppm and the doping concentration of aluminium was approximately 10,000 ppm.

Next, an erbium/aluminium-doped glass bar was disposed in parallel between two glass bars which form the core portions. These were affixed at both ends thereof to form the starting substrate. A glass soot which forms the cladding comprising pure quartz was deposited and transparent glass was formed to create the preform. This preform was drawn. In this manner, a REDPMF was produced such as shown in FIG. 19(a), wherein erbium was used to dope the portion of the cladding 33a interposed between two core portions 32a,32b.

The diameter of the core portion of this REDPMF was approximately 2.0 μm, the relative refractive index difference was 1.5%, the diameter of the erbium-doped region was approximately 2.0 μm, the index of birefringence was approximately $1.0 \times 10^{-4}$, the distance between the centers of the core portions was 2.9 μm, and the cutoff wavelength of the secondary modes was approximately 1.2 μm. The operations of a polarization-maintaining optical fiber were carried out at a wavelength of 1.5 μm. Additionally, it is noted here that the refractive index for the erbium-doped region rose slightly due to the addition of the aluminium. However, no effect on polarization-maintaining functions could be determined.

A laser oscillator such as shown in FIG. 21 was formed employing this REDPMF. Using a multiple wavelength coupler of wavelengths 1.48 μm and 1.55 μm for the first coupler 42, a 1.53 μm laser light of output approximately 5 mW was obtained at an excitation light input of approximately 50 mW.

INDUSTRIAL APPLICABILITY

As explained above, the polarization-maintaining optical fiber of the present invention can be employed in an optical fiber sensor or the like. Further, by doping the optical waveguide portion of this polarization-maintaining optical fiber with a rare earth element, it is possible to use the polarization-maintaining optical fiber of the present invention in a light amplifier or a laser oscillator. Moreover, by contacting two or more of these polarization-maintaining optical fibers, and heating, fusing and elongating them, utilization in an optical fiber coupler which carries out light branching, mixing, wave division and wave multiplexing while maintaining the polarization of the propagated light becomes possible.

We claim:

1. A polarization-maintaining optical fiber wherein a plurality of core portions each of which has a high refractive index are provided substantially longitudinally in parallel with a center axis of said optical fiber, and substantially in an array with the center axis in the cross section of said optical fiber, and wherein said core portions cooperate to propagate a single fundamental mode.

2. A polarization-maintaining optical fiber wherein a plurality of core portions, each of which has a high refractive index, and each of which has a relative refractive index of 0.15~3.0%, are provided substantially longitudinally in parallel with a center axis of said optical fiber, and substantially in an array with the center axis in cross section of said optical fiber, and wherein said core portions cooperate to propagate a single fundamental mode.

3. A polarization-maintaining optical fiber coupler formed by bringing into contact, heating, fusing and elongating two or more polarization-maintaining optical fibers in which a plurality of core portions each of which has a high refractive index are provided substantially longitudinally in parallel with a center axis of said optical fiber, and substantially in an array with the center axis in the cross section of said optical fiber, said core portions cooperating to propagate a single fundamental mode.

4. A polarization-maintaining optical fiber connection method characterized in that, when fusion connecting polarization-maintaining optical fibers in which a plurality of core portions each of which has a high refractive index are provided substantially longitudinally in parallel with a center axis of said optical fiber, and substantially in an array with the center axis in the cross section of said optical fiber, said core portions cooperating to propagate a single fundamental mode, the vicinity of the connection point is heated before or after connection.

5. A rare-earth-doped polarization-maintaining optical fiber which has a polarization-maintaining function wherein a plurality of core portions each of which has a high refractive index are provided substantially longitudinally in parallel with a center axis of said optical fiber, and substantially in an array with the center axis in the cross section of said optical fiber, said core portions cooperating to propagate a single fundamental mode, and wherein either one or both of the core portions and the cladding portion which is in a region having a low refractive index interposed between core portions are doped with a rare earth element.

6. A rare-earth-doped polarization-maintaining optical fiber according to claim 5 wherein the relative refractive index difference is 0.15~3.0%.

7. A light amplifier which employs the rare-earth-doped polarization-maintaining optical fiber of claim 5.

8. A laser oscillator which employs the rare-earth-doped polarization-maintaining optical fiber of claim 5.

9. A polarization-maintaining optical fiber, wherein a plurality of core portions, each of which has a high refractive index, are provided substantially longitudinally in parallel with a center axis of said optical fiber, and substantially in an array with the center axis in cross section of said optical fiber, symmetrically with respect to the center axis of said optical fiber, and wherein said core portions cooperate to propagate a single fundamental mode.

10. A polarization-maintaining optical fiber according to one of claims 1, 2, and 9, wherein the number of said core portions is an even number.

11. A polarization-maintaining optical fiber according to one of claims 1, 2, and 9, wherein the number of said core portions is an odd number.

12. A polarization-maintaining optical fiber according to claim 11, wherein one of said core portions is positioned at a center axis of said optical fiber, and the other core portions are symmetrically positioned with respect to a center axis of said optical fiber.

13. A polarization-maintaining optical fiber according to one of claims 1, 2, and 9, wherein each of said core portions is formed from a glass having a coefficient of thermal expansion larger than a glass which forms a cladding in said optical fiber.

14. A polarization-maintaining optical fiber according to one of claims 1, 2, and 9, wherein each of said core portions is formed from a glass selected from the group consisting of germanium-oxide-doped quartz, phosphorus-oxide-doped quartz, and pure quartz.

15. A polarization-maintaining optical fiber according to one of claims 1, 2, and 9, wherein said optical fiber comprises a cladding which is formed from a glass selected from the group consisting of pure quartz and fluorine-doped quartz.

16. A polarization-maintaining optical fiber according to one of claims 1, 2, and 9, wherein each of said core portions is formed from a glass which is doped with a rare earth element.

17. A polarization-maintaining optical fiber coupler formed by bringing into contact, heating, fusing, and elongating two or more polarization-maintaining optical fibers in which a plurality of core portions, each of which has a high refractive index, and each of which has a relative refractive index of 0.15~3.0%, are provided substantially longitudinally in parallel with a center axis of said optical fiber, and substantially in an array with the center axis in cross section of said optical fiber, said core portions cooperating to propagate a single fundamental mode.

18. A polarization-maintaining optical fiber coupler formed by bringing into contact, heating, fusing, and elongating two or more polarization-maintaining optical fibers in which a plurality of core portions, each of which has a high refractive index, are provided substantially longitudinally in parallel with a center axis of said optical fiber, and substantially in an array with the center axis in cross section of said optical fiber, symmetrically with respect to the center axis of said optical fiber, said core portions cooperating to propagate a single fundamental mode.

* * * * *